United States Patent [19]
Zolnowsky et al.

[11] Patent Number: 4,729,094
[45] Date of Patent: Mar. 1, 1988

[54] METHOD AND APPARATUS FOR COORDINATING EXECUTION OF AN INSTRUCTION BY A COPROCESSOR

[75] Inventors: John Zolnowsky, Menlo Park, Calif.; David S. Mothersole, Austin, Tex.; Douglas B. MacGregor, Austin, Tex.; William C. Moyer, Austin, Tex.

[73] Assignee: Motorola, Inc., Schaumburg, Ill.

[21] Appl. No.: 30,241

[22] Filed: Mar. 24, 1987

Related U.S. Application Data

[60] Continuation of Ser. No. 631,518, Jul. 18, 1984, abandoned, which is a division of Ser. No. 485,672, Apr. 18, 1983, abandoned.

[51] Int. Cl.[4] .................... G06F 15/16; G06F 9/30
[52] U.S. Cl. .................................................. 364/200
[58] Field of Search ... 364/200 MS File, 900 MS File

[56] References Cited

U.S. PATENT DOCUMENTS

| Re. 26,171 | 3/1967 | Falkoff | 364/200 |
|---|---|---|---|
| 3,614,745 | 10/1971 | Podvin et al. | 364/200 |
| 3,678,467 | 7/1972 | Nussbaum et al. | 364/200 |
| 3,871,578 | 3/1975 | Van de Goor et al. | 364/200 |
| 3,970,993 | 7/1976 | Finnila | 364/200 |
| 4,101,960 | 7/1978 | Stokes et al. | 364/200 |
| 4,149,240 | 4/1979 | Misunas et al. | 364/200 |
| 4,270,167 | 5/1981 | Koehler et al. | 364/200 |
| 4,509,116 | 4/1985 | Lackey et al. | 364/200 |

OTHER PUBLICATIONS

1981 Zilog Data Book, pp. 105-112, 120-127, 397-410.
National Semiconductor Corporation Data Book, NS 16082, Memory Management Unit, NS 16081 Floating Point Unit and NS 160325-6, NS 160325-4, High-Performance Microprocessors.

Primary Examiner—Eddie P. Chan
Attorney, Agent, or Firm—John A. Fisher; Jeffrey Van Myers

[57] ABSTRACT

A system for interfacing a Processor to a Coprocessor using standard bus cycles. The Processor, upon encountering in its instruction stream an instruction having a particular Operation word format, will transfer a Command word following the Operation word to a particular Coprocessor designated by a Coprocessor Identity field in the Operation word. Upon decoding the Command word, the Coprocessor will respond with any of a set of response primitives which define functions which the Coprocessor requires to Processor to perform in support of the Command by the Coprocessor. The interface provides for all functions which the Coprocessor may require, including selective vectoring to appropriate exception handlers.

5 Claims, 20 Drawing Figures

PROCESSOR - COPROCESSOR SYSTEM BLOCK DIAGRAM

*PROCESSOR TO COPROCESSOR TRANSFER*

COPROCESSOR TO PROCESSOR TRANSFER

| | BITS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|

OPERATION WORD

| 1 | 1 | 1 | 1 | Cp-Id | TYPE | TYPE DEPENDENT |
|---|---|---|---|---|---|---|

GENERAL

| 1 | 1 | 1 | 1 | Cp-Id | 0 | 0 | 0 | EFFECTIVE ADDRESS |
|---|---|---|---|---|---|---|---|---|
| COPROCESSOR COMMAND ||||||||||

BRANCH: WORD DISPLACEMENT

| 1 | 1 | 1 | 1 | Cp-Id | 0 | 1 | 0 | CONDITION |
|---|---|---|---|---|---|---|---|---|
| DISPLACEMENT |||||||||

BRANCH: LONG DISPLACEMENT

| 1 | 1 | 1 | 1 | Cp-Id | 0 | 1 | 1 | CONDITION |
|---|---|---|---|---|---|---|---|---|
| DISPLACEMENT-HIGH |||||||||
| DISPLACEMENT-LOW |||||||||

SET CONDITIONAL

| 1 | 1 | 1 | 1 | Cp-Id | 0 | 0 | 1 | EFFECTIVE ADDRESS |
|---|---|---|---|---|---|---|---|---|
| (RESERVED) |||||| CONDITION ||| cpDBcc

| 1 | 1 | 1 | 1 | Cp-Id | 0 | 0 | 1 | 0 | 0 | 1 | REGISTER |
|---|---|---|---|---|---|---|---|---|---|---|---|
| (RESERVED) ||||||||| CONDITION ||| cpTRAPcc

| 1 | 1 | 1 | 1 | Cp-Id | 0 | 0 | 1 | 1 | 1 | 1 | OPMODE |
|---|---|---|---|---|---|---|---|---|---|---|---|
| (RESERVED) ||||||||| CONDITION |||

SAVE

| 1 | 1 | 1 | 1 | Cp-Id | 1 | 0 | 0 | EFFECTIVE ADDRESS |
|---|---|---|---|---|---|---|---|---|

RESTORE

| 1 | 1 | 1 | 1 | Cp-Id | 1 | 0 | 1 | EFFECTIVE ADDRESS |
|---|---|---|---|---|---|---|---|---|

*COPROCESSOR INSTRUCTION FORMATS*

*FIG. 3*

|  15 14 13 12 11 10 9 8 | 7 6 5 4 3 2 1 0 |
|---|---|
| FORMAT | LENGTH |
| COPROCESSOR | |
| DEPENDENT | |
| INFORMATION | |
| ... | |

COPROCESSOR INTERNAL STATE FORMAT

| FORMAT | LENGTH | |
|---|---|---|
| $00 | 0 | EMPTY; SAME AS RESET, INITIALIZE |
| $00 | XX | RESERVED (XX MUST NOT EQUAL 0) |
| $01-$0D | XX | RESERVED (RESPOND AS NOT VALID; otherwise to be ignored on RESTORE type) |
| $0E | XX | COME AGAIN |
| $0F | XX | INVALID FORMAT |
| $10-$FF | LENGTH | COPROCESSOR DEFINED |

FORMAT WORD CONTENT

| ADDRESS LINES | VALUE | DEFINITION/FUNCTION |
|---|---|---|
| A31-A16 | 00...0010 | COPROCESSOR OPERATION |
| A15-A13 | Cp-Id | COPROCESSOR IDENTITY |
| A15-A5 | 00...00 | OPERATION AS A COPROCESSOR |
| A4-A0 | Cp-OPTYPE | COPROCESSOR REGISTER |

*ADDRESS STRUCTURE*

*FIG. 5*

| A4-A0 | OFFSET HEX | LENGTH BITS | ACCESS | FUNCTION |
|---|---|---|---|---|
| 0000X | 00 | 16* | READ | RESPONSE |
| 0001X | 02 | 16* | WRITE | CONTROL |
| 0010X | 04 | 16* | READ | SAVE |
| 0011X | 06 | 16* | R/W | RESTORE |
| 0100X | 08 | 16 | WRITE | INSTRUCTION OPERATION |
| 0101X | 0A | 16* | WRITE | INSTRUCTION COMMAND |
| 0110X | 0C | 16 | --- | RESERVED |
| 0111X | 0E | 16* | WRITE | INSTRUCTION CONDITION |
| 100XX | 10 | 32* | R/W | OPERAND |
| 1010X | 14 | 16 | READ | MOVEM BIT MASK |
| 1011X | 16 | 16 | --- | RESERVED |
| 110XX | 18 | 32 | R/W | INSTRUCTION ADDRESS |
| 111XX | 1C | 32 | R/W | OPERAND ADDRESS |

*PROGRAMMER'S MODEL FOR COPROCESSOR INTERFACE*

*FIG. 6*

| BITS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| RESPONSE REGISTER STRUCTURE | CA | PC | FUNCTION | | | | | | PARAMETER | | | | | | | |
| NULL | CA | PC | 0 | 0 | 1 | 0 | 0 | IA | 0 | 0 | 0 | 0 | 0 | 0 | 0 | TF |
| BUSY | 0 | 0 | 1 | 0 | 0 | 1 | 0 | 0 | 0 | 0 | 0 | 0 | 0 | 0 | 0 | 0 |
| EVALUATE EA AND TRANSFER DATA | CA | PC | DR | 1 | 0 | VALID EA | | | LENGTH | | | | | | | |
| EVALUATE EA AND TRANSFER ADDRESS | CA | PC | 0 | 0 | 1 | 0 | 1 | 0 | LENGTH | | | | | | | |
| TAKE ADDRESS AND TRANSFER DATA | CA | PC | DR | 0 | 0 | 1 | 0 | 1 | LENGTH | | | | | | | |
| TRANSFER STATUS REGISTER AND SCAN/PC | CA | PC | DR | 0 | 0 | 0 | 1 | SP | 0 | 0 | 0 | 0 | 0 | 0 | 0 | 0 |
| TRANSFER OPERATION WORD | CA | PC | 0 | 0 | 0 | 1 | 1 | 1 | 0 | 0 | 0 | 0 | 0 | 0 | 0 | 0 |
| TRANSFER INSTRUCTION STREAM | CA | PC | 0 | 0 | 1 | 1 | 1 | 1 | LENGTH (MUST BE EVEN) | | | | | | | |
| TRANSFER SINGLE PROCESSOR REGISTER | CA | PC | DR | 0 | 1 | 1 | 0 | 0 | 0 | 0 | 0 | 0 | REGISTER | | | |
| TRANSFER PROCESSOR CONTROL REGISTER | CA | PC | DR | 0 | 1 | 1 | 0 | 1 | 0 | 0 | 0 | 0 | 0 | 0 | 0 | 0 |

*COPROCESSOR PRIMITIVE FORMATS*

*FIG. 7*

| Primitive | Format |
|---|---|
| TRANSFER MULTIPLE PROCESSOR REGISTERS | CA\|PC\|DR\|0\|0\|1\|1\|0\|0\|0\|0\|0\|0\|0\|0 |
| EVALUATE EA AND TRANSFER MULTIPLE CP REGISTERS | CA\|PC\|DR\|0\|0\|0\|0\|1\|LENGTH |
| RELEASE | CA\|PC\|0\|0\|1\|0\|1\|1\|0\|0\|0\|0\|0\|0\|0 |
| TRANSFER TO OR FROM TOP OF STACK | CA\|PC\|DR\|0\|1\|1\|1\|0\|0\|0\|0\|0\|1\|0\|0 |
| SUPERVISOR CHECK | CA\|PC\|0\|0\|0\|1\|0\|0\|0\|0\|0\|0\|0\|0\|0 |
| WRITE TO PREVIOUSLY EVALUATED EA | CA\|PC\|1\|0\|0\|0\|0\|0\|LENGTH |
| TAKE PRE-INSTRUCTION EXCEPTION | 0\|PC\|0\|1\|1\|1\|0\|0\|VECTOR NUMBER |
| TAKE MID-INSTRUCTION EXCEPTION | 0\|PC\|0\|1\|1\|1\|0\|1\|VECTOR NUMBER |
| TAKE POST-INSTRUCTION EXCEPTION | 0\|PC\|0\|1\|1\|1\|1\|0\|VECTOR NUMBER |

*COPROCESSOR PRIMITIVE FORMATS – continued*

FIG. 7

| EFFECTIVE ADDRESS MODES | MODE/ REGISTER | ADDRESSING CATEGORIES | | | |
|---|---|---|---|---|---|
| | | DATA | MEMORY | CONTROL | ALTERABLE |
| DN | 000/N | X | | | X |
| AN | 001/N | | | | X |
| ANa | 010/N | X | X | X | X |
| ANa+ | 011/N | X | X | | X |
| ANa- | 100/N | X | X | | X |
| ANa(D) | 101/N | X | X | X | X |
| ANa(D,IX) | 110/N | X | X | X | X |
| XXX.W | 111/000 | X | X | X | X |
| XXX.L | 111/001 | X | X | X | X |
| PCa(D) | 111/010 | X | X | X | |
| PCa(D,IX) | 111/011 | X | X | X | |
| #XXX | 111/100 | X | X | | |

*EFFECTIVE ADDRESSING MODE CATEGORIES*

FIG. 8

*PRE-INSTRUCTION EXCEPTION STACK FRAME*

*MID-INSTRUCTION EXCEPTION STACK FRAME*

POST-INSTRUCTION EXCEPTION STACK FRAME

PROTOCOL FOR PROCESSING CONDITIONAL BRANCH OR SET

PROTOCOL FOR PROCESSING GENERAL INSTRUCTION

PROTOCOL FOR PROCESSING SAVE OPERATION

*PROTOCOL FOR PROCESSING RESTORE OPERATION*

MAIN PROCESSOR COPROCESSOR

REQUEST OPERAND READ:
1) RESPONSE REGISTER
   FUNCTION = TRANSFER DATA
   TO COPROCESSOR
2) RESPONSE REGISTER
   PARAMETER = OPERAND LENGTH

READ OPERAND PART FROM MEMORY:
1) ADDRESS = OPERAND-PART
   ADDRESS

WRITE DATA TO COPROCESSOR:
1) ADDRESS = COPROCESSOR
   OPERAND REGISTER
2) DATA = OPERAND-PART

RECEIVE DATA:
1) ACCEPT OPERAND-PART

CONTINUE UNTIL FINISHED:
1) IF OPERAND FINISHED,
   DROP THROUGH
2) ELSE, GO BACK TO READ
   FROM MEMORY

*PROTOCOL FOR MEMORY OPERAND
TO NON-DMA COPROCESSOR*

*FIG. 14*

PROTOCOL FOR NON-DMA COPROCESSOR
OPERAND TO MEMORY

PROTOCOL FOR COPROCESSOR DETECTED EXCEPTIONS

METHOD AND APPARATUS FOR COORDINATING EXECUTION OF AN INSTRUCTION BY A COPROCESSOR

This is a continuation of application Ser. No. 631,518 filed July 18, 1984, now abandoned, which is a divsion of Ser. No. 485,672 filed Apr. 18, 1983, now abandoned.

CROSS REFERENCE TO RELATED APPLICATIONS

Related subject matter is disclosed in the following applications filed Apr. 18, 1983 and assigned to the Assignee hereof:

1. U.S. patent application Ser. No. 485,676, now abandoned, entitled COPROCESSOR INSTRUCTION FORMAT, inventors Douglas B. MacGregor, John Zolnowsky and David Mothersole.

2. U.S. patent application Ser. No. 485,673, now abandoned, entitled A METHOD AND APPARATUS FOR COORDINATING EXECUTION OF AN INSTRUCTION BY A SELECTED COPROCESSOR, inventors David Mothersole, Douglas B. MacGregor and John Zolnowsky.

3. U.S. patent application Ser. No. 485,671, entitled A METHOD AND APPARATUS FOR EXECUTING AN INSTRUCTION CONTINGENT UPON A CONDITION PRESENT IN ANOTHER DATA PROCESSOR, inventors David Mothersole, John Zolnowsky and Douglas B. MacGregor.

4. U.S. patent application Ser. No. 485,814, entitled A METHOD AND APPARATUS FOR EXCEPTION VECTORING, inventors John Zolnowsky, David Mothersole and Douglas B. MacGregor.

5. U.S. patent application Ser. No. 485,811, now abandoned entitled A METHOD AND APPARATUS FOR INTERRUPTING A COPROCESSOR, inventors Douglas B. MacGregor, David Mothersole and John Zolnowsky.

6. U.S. patent application Ser. No. 485,686, now abandoned, entitled A METHOD AND APPARATUS FOR SELECTIVELY DELAYING AN INTERRUPT OF A COPROCESSOR, inventors Michael Cruess, Donald L. Tietjen, Van B. Shahan and Stanley E. Groves.

7. U.S. patent application Ser. No. 485,675, now abandoned, entitled A METHOD AND APPARATUS FOR SELECTIVELY EVALUATING AN EFFECTIVE ADDRESS FOR A COPROCESSOR, inventors Michael Cruess, David Mothersole, John Zolnowsky and Douglas B. MacGregor.

TECHNICAL FIELD

This invention relates generally to an interface between a processor and a coprocessor, and, more particularly, to a method and apparatus for a processor to coordinate execution of an instruction by a coprocessor.

BACKGROUND ART

When data processors were of the main frame form, expansions to the instruction or register set were typically implemented by simply adding additional electronics to the central processing unit (CPU), although significant expansions may have required additional cabinet space and power supply capacity. With the advent of minicomputers, such enhancements were more difficult to integrate into existing enclosures. One alternative to expanding the CPU was to provide the additional circuitry in a separate "hardware assist" module. However, this implementation required many of the signals otherwise internal to the CPU to be brought out via wiring harnesses to the module. In addition, the CPU often required new signals in order to coordinate the processing activities of the module. One form of this type of interface was used by Digital Equipment Corporation to couple the PDP-11 to the FP-11C Floating Point Processor.

As microprocessors matured, designers began to consider ways of providing the instruction/register enhancements which were not economically or technically feasible in monolithic form. A major effort was made to reduce the complexity of the interface. One conclusion was that more autonomy had to be built into the new hardware so that less information and control had to be provided by the CPU. This new breed of machine became known as coprocessors, since they really operated in cooperation with the processor rather than as a simple extension of the processor.

In general, coprocessors have been of two forms: those which monitor the processor's instruction stream to detect coprocessor instructions; and those which rely upon the processor for all information relating to coprocessor functions. One example of the first form is the Intel 8087 Numeric Data Processor which monitors the instruction of the Intel 8086 Processor looking for coprocessor instructions. This implementation requires significant hardware to enable the coprocessor to track the instruction queue in the processor. In addition, the 8086/8087 interface includes several special purpose signals for coordinating coprocessing activity. Another example of the first form is the Zilog Corporation Z8001/2 Extended Processor Units. As with the Intel interface, the Zilog interface requires significant duplication of hardware in the coprocessor and several special purpose signals. An example of the second form is the National Semiconductor Corporation NS16000 Slave Processors, which can be coupled to the processor either as a slave or as a peripheral. As a slave, the coprocessor relies on the processor for all instruction and operand information. This requires the processor to be able to determine from each coprocessor instruction exactly what information the coprocessor will need about the instruction. In addition, the processor must know where to find the Effective Address information within each instruction so that the operands may be pre-fetched for the coprocessor. As in the other examples, the National scheme requires some special purpose control lines for coordinating coprocessing activity.

No processor to coprocessor interface is known which requires no special signals, but rather relies wholly on standard bus cycles. Nor is any interface known which allows the processor to be unconcerned about the specific content of coprocessor instructions.

SUMMARY OF THE INVENTION

Accordingly, it is an object of the present invention to provide a method and apparatus for coordinating the execution of an instruction by a coprocessor by providing an expandable set of services available to the coprocessor in support of the instruction execution.

Another object of the invention is to provide a method and apparatus for coordinating the execution of an instruction by a coprocessor by providing a predetermined set of services available to the coprocessor, but vectoring to a exeception handler if the coprocessor requests a service not among this set of services.

These and other objects and advantages of the present invention are achieved in a method for coordinating from a first data processor the execution by a second data processor of an instruction received for execution by said first processor, comprising the steps of: receiving said instruction; writing to said second processor at least that portion of said received instruction which indicates the type of said instruction; reading a response from said second processor; selectively performing a predetermined task if said response indicates that said task must be performed by said first processor in support of the execution of said instruction by said second processor and vectoring to an exception handler if said response indicates that a task other than said predetermined task must be performed by said first processor in support of the execution of said instruction by said second processor. Also provided is an apparatus for practicing the method of the present invention.

BRIEF DESCRIPTION OF THE DRAWINGS

FIG. 3 is a table of the Coprocessor instructions available in the system of FIG. 1.

FIG. 5 is the address structure which enables the Processor to uniquely access the Coprocessor in FIG. 1.

FIG. 6 is the Programmer's Model for the Processor to Coprocessor interface in the system of FIG. 1.

FIG. 7 is a table of the Coprocessor Response primitives available in the system of FIG. 1.

FIG. 8 is a table of the Effective Address modes available in the system of FIG. 1.

FIG. 14 illustrates the protocol for a memory operand to non-DMA Coprocessor transfer in the system of FIG. 1.

DESCRIPTION OF A PREFERRED EMBODIMENT

Figure 1:
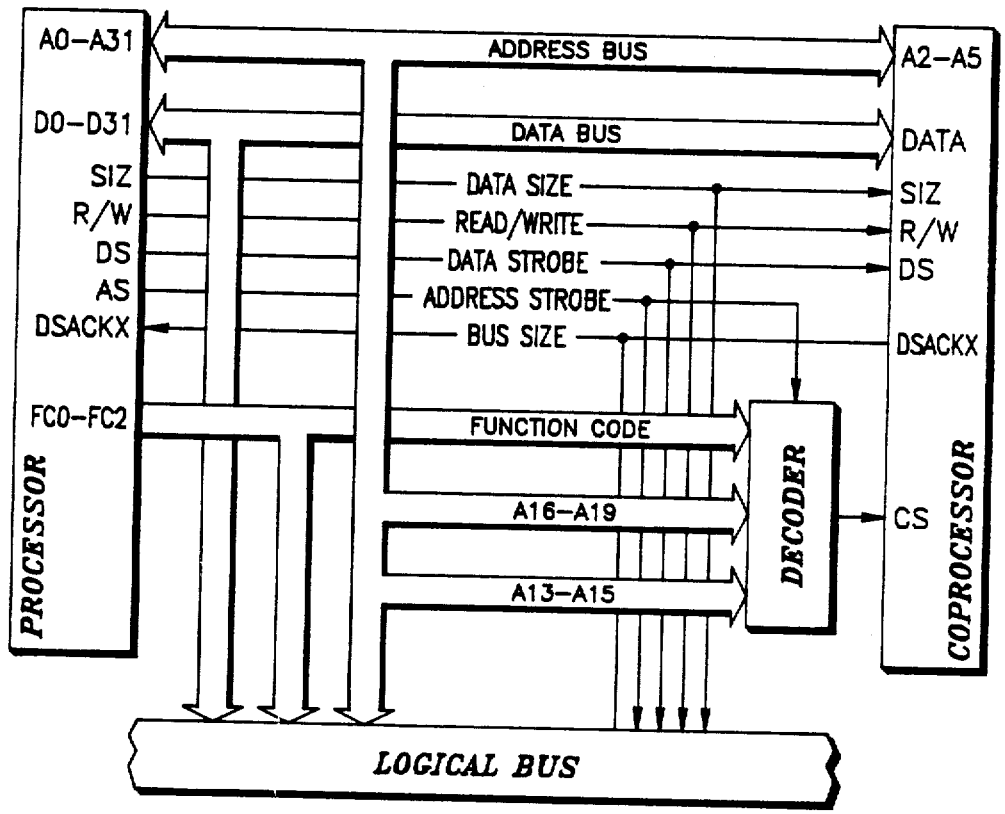
FIG. 1 is a block diagram of a data processing system having a Processor coupled to a Coprocessor using the interface of the present invention.

Shown in FIG. 1 is an interface which enables a Processor to coordinate with a Coprocessor in the execution of instructions which are in the instruction stream of the Processor. In general, the interface can be thought of as a mechanism for extending the instruction set of an existing Processor to provide for new data types, or to add specialized data operations. A fundamental goal of this interface is to facilitate the extension of the software Programmer's Model to include additional functions which can be utilized in the course of sequential instruction execution. While the Coprocessor appears to the Processor as a set of interface registers in the CPU address space, these registers are not necessarily related to the extensions to the software Programmers Model actually implemented by the Coprocessor.

The interface has been designed to emulate as closely as possible synchronous (non-concurrent) operation between the Processor and all associated Coprocessors. Only those features which have been identified as required for this non-concurrent model are included in the interface definition. Although features are available which can support asynchronous (concurrent) extensions of the Processor, the present interface is not designed to provide full support for such extensions. On the other hand, the present interface has been designed to allow a Coprocessor which is adapted to use the interface to be used as a peripheral by a Processor which does not implement the interface, since the Processor can simply execute instruction sequences which properly emulate the protocol of the interface.

In the material which follows, Coprocessors will be considered capable of assuming any one of several distinctive states:

Init: Initialized, reset, or empty; this may include initializing the content of registers to some predetermined value; ready to begin command execution.

Idle—Done: Idle, not busy, awaiting new direction from the Processor; results of any previous commands are available to Processor. Registers may contain operands and/or of previous operations.

Idle—Excp: Idle, not busy, but an exception is pending because of some previous incident. (Types of exceptions will be elaborated later.)

Busy—Srvc: Busy, occupied, and waiting for some service to be performed by the Processor; will not proceed until requested service is performed. (Services available will be described later.)

Busy—Wait: Busy, working on some task, but still in need of further service from the main processor to complete this task.

Busy—Free: Busy, occupied on the current or a previous task, and no further service is needed from the Processor.

In the present interface, no specialized bus signals are required to physically connect the Processor to the Coprocessors. All communication activity between the Processor and the Coprocessors is conducted using standard bus cycles. However, to provide a capability for addressing the Coprocessor without conflicting with conventional peripheral equipment, the Interrupt Acknowledge Address Space (Function Code 111) has been extended to include a CPU Address Space, a portion of which is dedicated to Coprocessors. Each Coprocessor can therefore be connected to the Processor in the same manner as any other peripheral, with each Coprocessor being assigned a unique address within the CPU Address Space. As with any other peripheral, each Coprocessor must always return Data Size Acknowledge (DSACK) when the Processor accesses any of that Coprocessor's Registers.

In general, all interprocessor transfers are initiated by the Processor. For example, during the execution of each Coprocessor instruction, the Processor writes Command information and operands to the appropriate Coprocessor, and reads service requests, results, and status information from the Coprocessor.

Figure 2A:
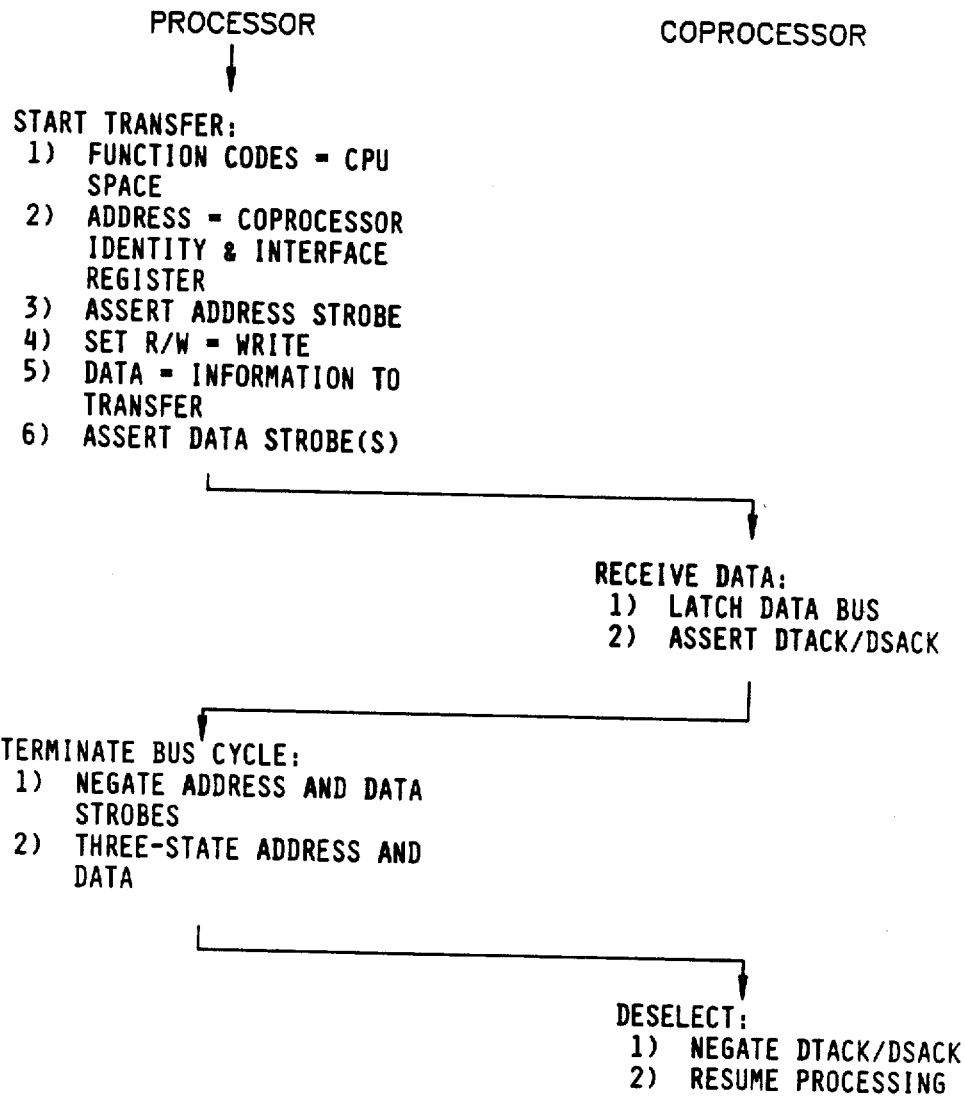
FIGS. 2a and 2b illustrate the Processor to Coprocessor write and read cycles, respectively, in the system of FIG. 1.

As shown in FIG. 2a, the Processor initiates a write cycle to a Coprocessor by issuing the CPU Address Space Function Code and providing the address of the appropriate Coprocessor on the address bus. The Processor then asserts Address Strobe (AS) and negates Read/Write (R/W) to indicate that the transfer is a write. The data is then provided on the data bus and Data Strobe (DS) asserted. After the selected Coprocessor has latched the data from the data bus and acknowledged the transfer by asserting Data Size Acknowledge (DSACK), the Processor negates the Address and Data Strobes and three-states the address and data buses. The Coprocessor then terminates the bus cycle by negating DSACK.

Figure 2B:
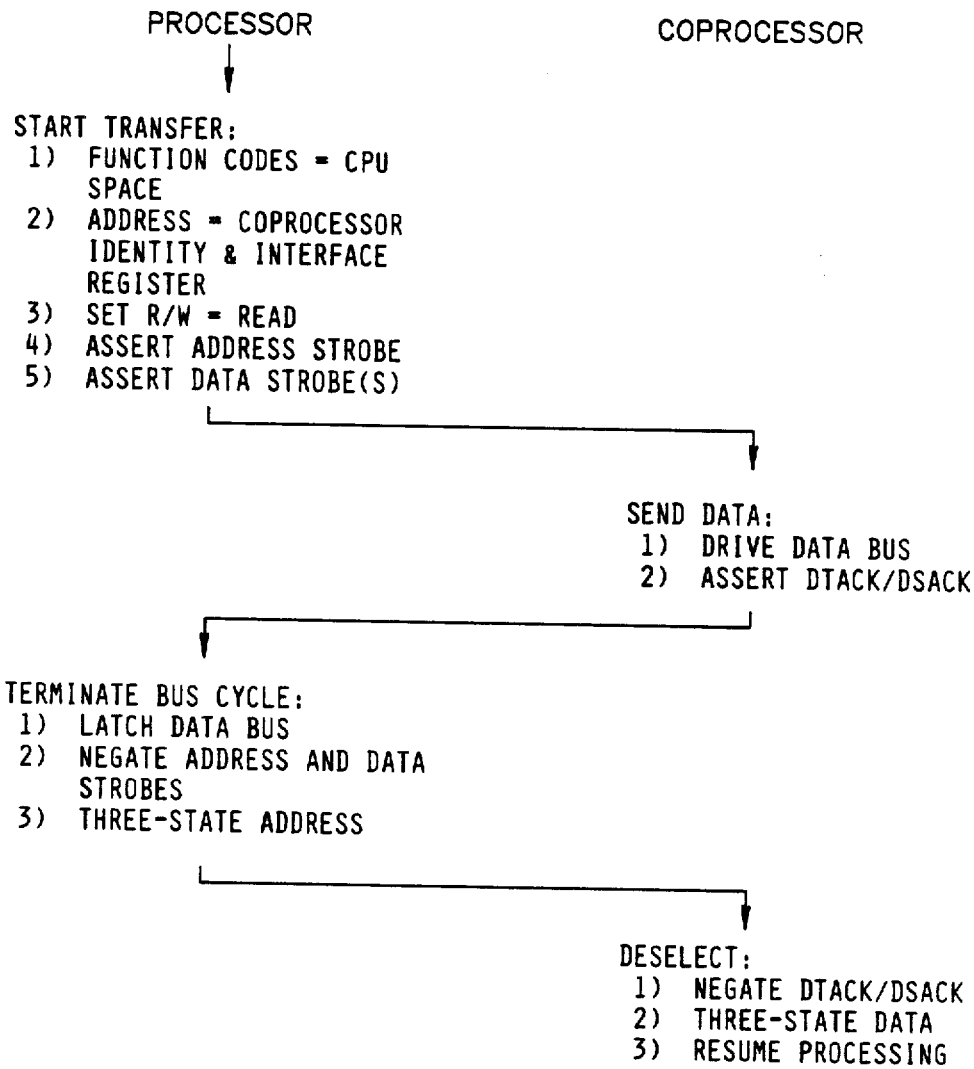

As shown in FIG. 2b, the Processor initiates a read cycle from a Coprocessor by issuing the CPU Address Space Function Code and providing the appropriate Coprocessor address on the address bus. The Processor then asserts R/W to indicate that the transfer is a read and asserts the Address and Data Strobes. The selected Coprocessor then provides the data on the data bus and acknowledges the transfer by asserting DSACK. After latching the data from the data bus, the Processor negates the Address and Data Strobes and three-states the address and data buses. The Coprocessor then terminates the bus cycle by negating DSACK and three-stating the data bus.

Coprocessor Instructions

As shown in FIG. 3, all Coprocessor instructions are distinguished by having a hexadecimal "F" (i.e. all 1's) in the first four bits of the first word thereof. This "F-line" comprises the Operation Word, and includes a Coprocessor Identity (Cp-Id) field to designate the particular Coprocessor with which the Processor is to coordinate the execution of the instruction, and a Type field to indicate to the Processor the specific operation to be performed: General, Branch, Conditional, Save, or Restore. Depending upon the type of Coprocessor instruction, additional extension words may be required.

With the exception of the Save operation, all Coprocessor instruction types have a typical protocol which the Processor will follow in coordinating the execution of the instruction:

(a) a write of some Command information to the designated Coprocessor;

(b) a read of the response of the Coprocessor to receiving the Command information;

(c) if the response indicates the Coprocessor is too busy to accept the information, the Processor will return to (a), above;

(d) if the response indicates some exception condition, the Processor will acknowledge the exception, before beginning the appropriate exception handing procedure;

(e) if the response indicates that the Coprocessor must complete some other action, such as a computation, before responding to the information, the Processor will return to (b), above;

(f) if the response indicates that the Coprocessor needs the Processor to perform some function such as evaluating an Effective Address (EA) and transferring an operand between the EA and the Coprocessor, the Processor will perform the requested function and return to (b), above; and (g) if the response indicates that the Coprocessor requires no further assistance, the Processor will proceed to the next instruction in the Processor's instruction stream.

In the following descriptions of the several instruction types, emphasis will be placed upon the specific information which is exchanged, as well as the specific functions which the Processor may be called upon to perform for the Coprocessor.

The General instruction form shown in FIG. 3 is used to describe the most common Coprocessor data-manipulation instructions. The General instruction includes at least one extension word which defines a particular Coprocessor Command. This word, by definition the Command Word, is initially written by the Processor to the Coprocessor to request the cooperation of the Coprocessor in the execution of the instruction. If the instruction requires an operand to be fetched or stored, the Effective Address field contains the information required to access the operand. If there is no operand to be fetched or stored, then the Effective Address field contains miscellaneous information.

In general, the Processor separates memory references into two classes: program and data. This distinction results in two address spaces, each with a complete logical address range. A program reference implies an access to the object text of the program currently being executed. Thus, all instruction fetches are made in the program space. A data reference implies an access to an operand required by an instruction. Operand reads are in the data space, except for immediate operands which are embedded in the instruction stream. All operand writes are in the data space.

In the descriptions which follow, Registers in the Processor will be referred to using the following mnemonic descriptors:

An = Address Register n
Dn = Data Register n
Rn = any Register n
PC = Program Counter
SR = Status Register
SP = active Stack Pointer
USP = User Stack Pointer
MSP = Master Stack Pointer
ISP = Interrupt Stack Pointer
SSP = Supervisor Stack Pointer Indirection is the action of taking the object or address value specified not as the Effective Address, but as the location containing the Effective Address. For example, when an Address Register is used as a pointer to the operand rather that the holder of the operand, the addressing mode is referred to as Address Register Indirect. The mnemonic symbol of indirection is "@", the indirection operator Typically, Register selection is made by specifying the Register number in a Register field within the instruction. Other fields of the instruction specify whether the reference is to a Data Register or to an Address Register, and how the selected Register is to be used.

Most instructions specify the location of an operand using the Effective Address (EA) field in the Operation Word. The EA is composed of two three-bit subfields: the Mode specification field, and the Register specification field. Each of the address modes is selected by a particular value in the Mode specification subfield of the EA. However, depending upon the specified Effective Address mode, further information may be required to fully specify the EA. This information, called the EA extension, is in a following word or words, and is considered part of the instruction. The Effective Address field positions for each particular instruction are shown in FIG. 3. Valid Effective Address field specifications include the following:

1. Register Direct Modes: These specify that the operand is in one of the 16 multifunction Registers.

| Data Register Direct | |
|---|---|
| Notation: | Dn |
| Mode: | 000 |
| Register: | n |

The operand is in the Data Register specified by the EA Register field.

| Address Register Direct | |
|---|---|
| Notation: | An |
| Mode: | 001 |
| Register: | n |

The operand is in the Address Register specified by the EA Register field.

2. Memory Address Modes: These EA modes specify the address of an operand in memory.

| Address Register Indirect | |
|---|---|
| Notation: | An@ |
| Mode: | 010 |
| Register: | n |

The address of the operand is in the Address Register specified by the Register field. The reference is classed as a data reference.

| Address Register Indirect with Post-increment | |
|---|---|
| Notation: | An@+ |
| Mode: | 011 |
| Register: | n |

The address of the operand is in the Address Register specified by the Register field. After the operand address is used, the address is incremented by 1, 2, or 4 depending upon whether the size of the operand is byte, word or long, respectively. If the Address Register is the Stack Pointer and the operand size is byte, the address is incremented by 2 rather than 1, to keep the Stack Pointer on a word boundary. The reference is classed as a data reference.

| Address Register Indirect with Pre-decrement | |
|---|---|
| Notation: | An@− |
| Mode: | 100 |
| Register: | n |

The address of the operand is in the Address Register specified by the Register field, except that before the operand address is used, the address is decremented by 1, 2, or 4 depending upon whether the operand size is byte, word or long, respectively. If the Address Register is the Stack Pointer and the operand size is byte, the address is decremented by 2 rather than 1, to keep the Stack Pointer on a word boundary. The reference is classed as a data reference.

| Address Register Indirect with Displacement | |
|---|---|
| Notation: | An@(d) |
| Mode: | 101 |
| Register: | n |

This address mode requires one word of extension. The address of the operand is the sum of the address in the address Register and the sign extended displacement integer in the extension word. The reference is classed as a data reference.

Address Register Indirect with Index/Indirect

This address mode uses two different formats of extension. The brief format provides fast indexed addressing, while the full format provides a number of options in size of displacements and indirection.

Both forms use an index operand. Notationally, this index operand is specified "Ri.sz.scl". "Ri" selects one of the general Data or Address Registers for the Index Register. The term "sz" refers to the index size, and may be either "W" or "L". The term "scl" refers to the index scale selection, and may be any of 1, 2, 4, or 8.

The index operand is derived from the Index Register The Index Register is a Data Register if bit [15]=0 in the first extension word, and is an Address Register if bit [15]=1. The Register number of the Index Register is given by bits [14:12] of the extension word. The index size is given by bit [11] of the extension word; if bit [11]=0 the index value is the sign extended low order word integer of the Index Register, while if bit [11]=1 the index value is the long integer in the Index Register. Finally, the index value is scaled according to the scaling selection in bits [10:9], to derive the index operand The scale selections 00, 01, 10, or 11 select scaling of the index value by 1, by 2, by 4 or by 8, respectively.

| Brief Format Indexing | |
|---|---|
| Notation: | An@(d, Ri.sz.sc1) |
| Mode: | 110 |
| Register: | n |

This address mode requires one word of extension. The address of the operand is the sum of the address in the Address Register, the sign extended displacement integer in the low order eight bits of the extension word, and the index operand. The reference is classed as a data reference.

| Full Format Indexing or Memory Indirect | |
|---|---|
| Notation: | See following |
| Mode: | 110 |
| Register: | n |

This address mode requires from one to five words of extension. The full format indexing address mode provides a very versatile and powerful address generation capability. This mode offers any combination of the following additional capabilities:

a. word or long displacement (instead of 8-bit displacement).

b. suppression of base registers or index operand in address calculation (take its value to be zero).

c. an additional level of indirection in the address calculation, with indexing occuring either before or after the indirection.

The full format addressing forms are as follows:

An@(dsize)@(dsize)
An@(dsize,Ri.sz.scl)
An@(dsize,Ri.sz.scl)@(dsize)
An@(dsize)@(dsize,Ri.sz.scl)
xxx.W@(dsize)
xxx.W(Ri.sz.scl) *
xxx.W(Ri.sz.scl)@(dsize)
xxx.W@(dsize,Ri.sz.scl)
xxx.L@(dsize)
xxx.L(Ri.sz.scl) *
xxx.L(Ri.sz.scl)@(dsize)
xxx.L@(dsize,Ri.sz.scl)

* with sz=L and scl=1, these addressing forms provide Di@(dsize) addressing.

The "dsize" operands are displacements. These may be null (taken as zero), or word or long displacements. The "ri.sz.scl" is an index operand, which may be optionally suppressed. There is one level of memory indirect allowed, and the index operand may be added either before (preindexing) or after (postindexing) the memory indirection step. The indirection step fetches a long word address from the location specified. The fetched address serves as the base address for the final steps of address calculation.

In full format indexing extension words, bits [15:9] are the index operand specification. If Base Suppress (BS) bit [7]=0, the base Address Register is added to the address at the appropriate step. If BS=1, the value of the base Address Register is taken to be zero. If Index Suppress (IS) bit [6]=0, the index operand is evaluated and added to the address appropriate step. If IS=1, the value of the index operand is taken to be zero. Bdisp bits [5:4] selects the size of the displacement for the base Address Register. The values 01, 10, or 11 select either a null displacement (taken as zero), a word displacement (which is sign-extended to 32 bits), or a long displacement, respectively. The Bdisp value of 00 is reserved. I/Isel bits [2:0] select the indirect and indexing operation. The options for I/Isel are as follows:

| I/Isel | Operation |
|--------|-----------|
| 000 | No memory indirection |
| 001 | Pre-indexed indirect with null displacement |
| 010 | Pre-indexed indirect with word displacement |
| 011 | Pre-indexed indirect with long displacement |
| 100 | Reserved |
| 101 | Indirect Post-indexed with null displacement |
| 110 | Indirect Post-indexed with word displacement |
| 111 | Indirect Post-indexed with long displacement |

Any memory indirect reference is classed as a data reference. The operand reference is classed as a data reference.

3. Special Address Modes:

The special address modes do not use the EA field to specify a Register number, but to specify a submode.

| Absolute Short Address | |
|---|---|
| Notation: | xxx.W |
| Mode: | 111 |
| Register: | 000 |

This address mode requires one word of extension. The address of the operand is in the extension word. The 16-bit address is sign extended before it is used. The reference is classed as a data reference.

| Absolute Long Address | |
|---|---|
| Notation: | xxx.L |
| Mode: | 111 |
| Register: | 001 |

This address requires two words of extension. The address of the operand is in the extension words, with the high-order portion of the address in the first word and the low-order portion in the second word. The reference is classed as a data reference.

| Program Counter with Displacement | |
|---|---|
| Notation: | PC@(d) |
| Mode: | 111 |
| Register: | 010 |

This address mode requires one word of extension. The address of the operand is the sum of the address in the Program Counter and the sign extended displacement integer in the extension word. The value in the Program Counter is the address of the extension word. The reference is classed as a program reference.

Program Counter with Index

This address mode uses two different formats of extension. The brief format provides fast indexed addressing, while the full format provides a number of options in size of displacements and indirection.

Both forms use an index operand. Notationally, this index operand is specified "Ri.sz.scl". "Ri" selects one of the general Data or Address Registers for the Index Register. The term "sz" refers to the index size, and may be either "W" or "L". The term "scl" refers to the index scale selection, and may be any of 1,2,4, or 8.

The index operand is derived from the Index Register. The Index Register is a Data Register if bit [15]=0 in the first extension word, and is an Address Register if bit [15]=1. The Register number of the Index Register is given by bits [14:12] of the extension word. The index size is given by bit [11] of the extension word; if bit [11]=0 the index value is the sign extended low order word integer of the Index Register, while if bit [11]=1 the index value is the long integer in the Index Register. Finally, the index value is scaled according to the scaling selection in bits [10:9], to derive the index operand. The scale selections 00, 01, 10, or 11 select scaling of the index value by 1, by 2, by 4, or by 8, respectively.

| Brief Format Indexing | |
|---|---|
| Notation: | PC@(d, Ri.sz.scl) |
| Mode: | 111 |
| Register: | 011 |

This address mode requires one word of extension. The address of the operand is the sum of the address in the Program Counter, the sign extended displacement integer in the low order eight bits of the extension word, and the index operand. The value in the Program Counter is the address of the extension word. The reference is classed as a program reference.

| Full Format Indexing or Memory Indirect | |
|---|---|
| Notation: | See Following |
| Mode: | 110 |
| Register: | n |

This address mode requires from one to five words of extension. The full format indexing address mode provides a very versatile and powerful address generation capability. This mode offers any combination of the following additional capabilities:

a. word or long displacement (instead of 8-bit displacement).
b. suppression of the Program Counter or index operand in address calculation (take its value to be zero).
c. an additional level of indirection in the address calculation, with indexing occuring either before or after the indirection.

The full format addressing forms are as follows:

PC@(dsize)@(dsize)
PC@(dsize,Ri.sz.scl)
PC@(dsize,Ri.sz.scl)@(dsize)
PC@(dsize)@(dsize,Ri.sz.scl)
xxx.W@(dsize)
xxx.W(Ri.sz.scl)
xxx.W(Ri.sz.scl)@(dsize)
xxx.W@(dsize,Ri.sz.scl)
xxx.L@(dsize)
xxx.L(Ri.sz.scl)
xxx.L(Ri.sz.scl)@(dsize)
xxx.L@(dsize,Ri.sz.scl)

The "dsize" operands are displacements. These may be null (taken as zero), or word or long displacements. The "Ri.sz.scl" is an index operand, which may be optionally suppressed. There is one level of memory indirect allowed, and the index operand may be added either before (pre-indexing) or after (post-indexing) the memory indirection step. The indirection step fetches a long word address from the location specified. The fetched address serves as the base address for the final steps of address calculation.

In full format indexing extension words, bits [15:9] are the index operand specification. If Base Suppress (BS) bit [7]=0, the Program Counter is added to the address at the appropriate step. If BS=1, the value of the Program Counter is taken to be zero. If Index Suppress (IS) bit [6]=0, the index operand is evaluated and added to the address at the appropriate step. If IS=1, the value of the index operand is taken to be zero. Bdisp bits [5:4] select the size of the displacement for the base Program Counter. The values 01,10, or 11 select either a null displacement (taken as zero), a word displacement (which is sign-extended to 32 bits), or a long displacement, respectively. The Bdisp value of 00 is reserved. I/Isel bits [2:0] select the indirect and indexing operation. The options are the same as listed above.

The value in the Program Counter is the address of the first extension word. Any memory indirect reference is classed as a program reference. The operand reference is classed as a program reference.

| Immediate Data | |
|---|---|
| Notation: | #xxx |
| Mode: | 111 |
| Register: | 100 |

This address mode requires either one, two, or more words of extension. The operand is in the extension word(s) in the instruction. For byte operations, the operand is in the low order byte of the extension word. For word operations the operand is in the extension word. For long operations, the operand is in the two extension words, with the high order 16 bits in the first word and the low order 16 bits in the second word. For longer operand sizes, the operand occupies a sufficient number of words to hold that size of operand.

The valid Effective Address mode encodings can be summarized as follows:

| Mode | Reg | Addressing Mode |
|---|---|---|
| 000 | # | Data Register Direct |
| 001 | # | Address Register Direct |
| 010 | # | Address Register Indirect (ARI) |
| 011 | # | ARI with Post-increment |
| 100 | # | ARI with Pre-decrement |
| 101 | # | ARI with Displacement |
| 110 | # | ARI with Index/Indirect |
| 111 | 000 | Absolute Short |
| 111 | 001 | Absolute Long |
| 111 | 010 | PC with Displacement |
| 111 | 011 | PC with Index/Indirect |
| 111 | 100 | Immediate |
| 111 | 101 | undefined |
| 111 | 110 | undefined |
| 111 | 111 | undefined |

In general, Effective Address modes may be categorized by the ways in which they may be used:

Data: If an Effective Address mode may be used to refer to data operands, it is considered a data addressing Effective Address mode.

Memory: If an Effective Address mode may be used to refer to memory operands, it is considered a memory addressing Effective Address mode.

Alterable: If an Effective Address mode may be used to refer to alterable (writable) operands, it is considered an alterable addressing Effective Address mode.

Control: If an Effective Address mode may be used to refer to memory operands without an associated size, it is considered a control addressing Effective Address mode.

The formats of each of the Coprocessor instructions are shown in FIG. 3. However, the Effective Address extension words are not explicitly illustrated. These extensions, if any, would follow the illustrated words of the instructions. The Coprocessor instructions can be divided into the following types:

1. Conditional Test Type Instructions:

The following types of instructions are directly supported by the Coprocessor interface to guarantee uniform treatment of condition codes by all processing elements. The Conditional Test instructions uniformally present a six bit condition selection code to the Coprocessor for evaluation. The Processor makes no interpretation of the condition selection code, and the Coprocessor need only be able to evaluate the selected condition.

Branch Type Instruction

In the Word Branch and the Long Word Branch instructions, the Processor writes a condition to the Coprocessor for evaluation. The Processor then interrogates the Coprocessor for the value of the condition, and if the Coprocessor response indicates the condition is satisfied, then program execution continues at the location (PC)+Displacement, where the Displacement is a two's complement integer in the extension word(s). The value of the PC is the address of the Displacement word(s). The Displacement may be either a 16-bit word or a 32-bit long word. Any other extension words, such as further Coprocessor parameters, would follow the Operation word and precede the Displacement word(s).

Conditional Type Instruction

Three kinds of Conditional instructions are available: Set According to Condition, Decrement and Branch on Condition, and Trap on Condition. The Type field is the same for all Conditionals, and the first extension word of the Conditional type instruction contains the condition to be evaluated. The Processor writes the condition to the Coprocessor for evaluation, and interrogates the Coprocessor to determine if the condition is satisfied.

Only alterable data Effective Address mode is allowed for the Set According to Condition instruction. The Effective Address is evaluated by the Processor to determine the location of the byte to be modified. If the Coprocessor indicates that the condition is satisfied then the location byte is set true (all ones), otherwise that byte is set false (all zeros).

If the condition is met for the Decrement and Branch on Condition form, no operation is performed. If the condition is not met, a count maintained in the low-order 16 bits of the selected Data Register is decremented by 1. If the result is −1, the counter is exhausted and execution continues with the next instruction. If the counter is not exhausted, execution continues at location whose address is the sum of the Program Counter and the sign-extended 16-bit Displacement.

For the Trap on Condition form, a trap is taken if the condition is satisfied; otherwise execution continues with the next instruction. The Opmode field selects the number of Displacement words. If Opmode=010, the instruction has a word displacement. If Opmode=011, the instruction has a long displacement. If Opmode=100, the instruction has no displacement. The Trap on Condition does not use the displacement, if any, but the definition of its value is left to the user.

2. System Control Type Instructions:

The following two instruction types allow system control and management of Coprocessors. They are used for operating systems task context switching procedures. They permit switching of a Coprocessor between instructions, between primitives, or between operand transfer cycles. These same instructions may be used whether the Coprocessor is idle, or is concurrently executing a previous Coprocessor instruction. These instructions are appropriate even when the Processor has had a virtual memory fault while processing a Coprocessor service request. Both types are privileged.

Coprocessor Save Type

This instruction is used by an operating system if it must save the entire context of a Coprocessor, both the user-visible and the user-invisible state. If data movement instructions which allow saving of the visible state are implemented in the General type instructions, the Save type instruction may save only the invisible state. This would require the operating system to save the invisible state via the Save instruction and then to save the visible state via the data movement instructions.

This is a privileged instruction. Only the Alterable Control or Pre-decrement Effective Address modes are allowed. With respect to the Coprocessor, the Save instruction may be inititated on any bus cycle. The Processor initiates a Save instruction by reading an internal state format word from the Coprocessor. This action indicates to the Coprocessor that it must immediately suspend its current operation and save its internal state. The format word, together with other internal state information read from the Coprocessor, is saved at the Effective Address. When the Save operation is complete, the Coprocessor will be in the Idle_Done state.

Coprocessor Restore Type Instruction

This instruction is used by an operating system if it must restore the entire context of a Coprocessor, both the user-visible and the user-invisible state. If data movement instructions which allow restoring of the visible state are implemented in the General type instructions, the Restore type instruction may restore only the invisible state. This would require the operating system to restore the visible state via the data movement instructions and then to restore the invisible state via the Restore instruction. Some additional control uses are described below.

This is a privileged instruction. Only the Control or Post-increment Effective Address modes are allowed. With respect to the Coprocessor, the Restore operation may be initiated on any bus cycle. The Processor initiates a Restore instruction by reading a internal state format word from the Effective Address and writing it to the Coprocessor. This action indicates to the Coprocessor that regardless of its current state of operation, the Coprocessor must immediately re-instate a different context. The Processor asks the Coprocessor to validate the format, and if the Coprocessor does not recognize the format, the Processor takes a format error exception and the Coprocessor goes to the Idle_Done state. If the format is valid, the Processor transfers the remainder of the internal state information from the Effective Address to the Coprocessor.

Coprocessor Interface Registers

As explained generally above, the Processor and Coprocessor communicate via bus cycles in the CPU Address Space. For this purpose, several addressable Registers are implemented in the Coprocessor. These Registers are assigned specific addresses within a range of addresses dedicated to each Coprocessor. The address structure for accessing a particular Register within a specific Coprocessor using one of these bus cycles is given in FIG. 5.

During execution of Coprocessor instructions, the Processor will access Coprocessor Registers using the Coprocessor Operation Type (Co-OpType) selection field (A4—A0), with the Coprocessor Operation field (A12—A05) equal to zeros. The Coprocessor Operation field is used to distinguish operations that treat the Coprocessor as a peripheral, either for testing or for use in other systems. The additional address lines (A12—A05) allow a Coprocessor to have Registers other than those which the Processor uses to execute Coprocessor instructions. This address structure allows a Coprocessor to be used as a peripheral on a Processor which does not have a Coprocessor interface, by using instruction sequences which emulate the protocol of the Coprocessor interface.

The Coprocessor Identity field is taken from the Cp-Id field of the F-line Operation Word. In a system, it should uniquely identify a Coprocessor. This field would not necessarily be decoded by each Coprocessor, but could go through an external decode to provide a chip select function to the Coprocessor as illustrated in FIG. 1. This would allow multiple Coprocessors of the same type in a system, and avoid conflicts of assigning Coprocessor identities.

FIG. 6 shows the address assignment for the Coprocessor interface Registers. This structure identifies what kind of operation the Processor expects from the Coprocessor, and permits additional addresses for use of the Coprocessor as a peripheral.

The address lines shown are those that will be used if the Coprocessor is used as a Coprocessor. If it is desired to also be used as a peripheral, other interface Registers or addressable locations may be defined and used. A Coprocessor must implement the locations indicated with an asterisk (*) in order to permit each of the instruction types to be implemented.

If the Coprocessor interface port is less than 32 bits in width, the Processor will make successive accesses to transfer information which is longer than the port size.

The Registers in the Coprocessor interface Programmer's Model need not correspond to the physical Registers in the interface section of a Coprocessor. It is the function of the Coprocessor bus interface to perform address decodes to cause the physical Registers to appear in this pattern.

In the following descriptions of the various Coprocessor Registers, the Register name is followed by the offset of the register address within the address range of a particular Coprocessor. Any address associated with a Coprocessor Register is in the CPU Space.:

Response Register 00

The 16-bit Response Register is the means by which the Coprocessor requests the Processor to perform functions which must be performed in order for the Coprocessor to complete the Command. The Coprocessor will always assert DSACK when the Response Register is accessed; accesses are always valid and no protocol violation can occur.

Control Register 02

This 16-bit Register is accessed by the Processor to acknowledge a Coprocessor exception request, or to abort a Coprocessor instruction containing an illegal Effective Address field. The Processor writes a mask into the Control Register. A mask with bit 1 set acknowledges and clears pending exceptions as described below. A mask with bit 0 set directs the Coprocessor to abort processing of the current instruction, and to return to the Idle—Done state.

Save Register 04

Reading this 16-bit Register causes the Coprocessor to initiate a Save operation as described below. The data supplied by the Coprocessor is a 16-bit Format word of the Coprocessor internal state (see FIG. 4a). The Processor will read the Save Register until the Coprocessor indicates that it is ready to initiate the Save sequence.

Restore Register 06

Writing this 16-bit register causes the Coprocessor to immediately suspend any current operation, and prepare to do a Restore operation as described below. The data supplied by the Processor is the 16-bit Format word of the Coprocessor internal state (see FIG. 4a). After examining the Format word, the Coprocessor indicates to the Processor whether the Format is valid or not by placing a code in the Response Register. In addition, the Coprocessor may indicate that the Coprocessor is busy preparing for the restore, or that the Coprocessor is ready for the transfer of the remainder of the state.

Operation Word Register 08

The Processor will transfer the 16-bit Coprocessor Operation word to this Register upon the request of the Coprocessor.

Command Register 0A

The 16-bit Command Register is used only for General type instructions. The Processor initiates the General instruction by writing the Command word to the Command Register.

Condition Register 0E

The Condition Register is used for the Branch and Conditional type instructions. The Processor writes a 6-bit Condition Selection Code which specifies the condition to be evaluated.

Operand Register 10

The 32-bit Operand Register is the Register through which the data operands requested by the Coprocessor are transferred. If the operand length is less than four bytes, it is transferred aligned with the most significant bits of the Operand Register. If the operand length is four bytes or longer, the Processor will make successive accesses to this Register, transferring the operand four bytes per access, until less than four bytes remain and any remaining part will be transferred aligned with the most significant bits of the Operand Register.

Register Selector 14

The 16-bit Register Selector Register is read by the Processor only upon request of the Coprocessor. This Register provides Control Register selection for the Transfer Main Processor Control Registers primitive described below; to count and select the Registers for the Transfer Multiple Main Processor Registers primitive described below; and to count the number of Coprocessor Registers involved in the Transfer Multiple Coprocessor Registers primitive described below.

Instruction Address Register 18

This 32-bit Register is used as the source or destination of the Instruction Address when the Coprocessor primitive requests such a transfer. This storage of the Instruction Address is provided to facilitate operation of trace and/or exception-handling software in systems with Coprocessors which implement asynchronous (concurrent) instructions. Thus not all Coprocessors need this Register. The Coprocessor may never need this information in operation. If provided, the Coprocessor should keep the Register updated as required.

Operand Address Register 1C

This 32-bit Register is used as the source or destination of address operands which are to be transferred. The Operand Address Register is accessed when requested by a Coprocessor primitive.

Coprocessor Response Primitives

The General and Conditional instructions are initiated by the Processor by writing the Command word to the Coprocessor Command or Condition Registers. Upon receiving the Command word, the Coprocessor determines if any functions must be performed by the Processor before the Command can be performed. If so, the Coprocessor constructs a "primitive" instruction to the Processor in the Coprocessor Response Register, and then asserts DSACK. Upon reading the Response Register, the Processor "executes" this primitive instruction to provide the support services required by the Coprocessor for performing the Command.

As can be seen in FIG. 7a, the Response Register is comprised primarily of a Function field which specifies a particular function which the Coprocessor requires the Processor to perform. In some primitives, a Parameter field is provided for the Coprocessor to define a necessary parameter for the specified Function. In most primitives, the Coprocessor may set a Pass Program Counter (PC) bit to request the Processor to pass the current contents of the Processor Program Counter to the Coprocessor Instruction Address Register before the requested function is performed. In this manner, the Coprocessor may maintain a record of the address of the Operation word of the particular instruction being executed. As appropriate, the Coprocessor may set a Come Again (CA) bit to indicate to the Processor that the Response Register should be read again after the requested function has been performed. If the CA bit is not set, or is not defined for a particular primitive, then the Processor is generally free to continue with other processing activity after performing the specified function.

At the beginning of execution of each instruction, a Program Counter within the Processor contains the address within the current Instruction Space of the first word of the instruction currently being executed. At this time, a ScanPC Register contains the address of the word immediately following the Operation word. As each word of the instruction is "used", the ScanPC is sequentially incremented to point to the next word in the instruction stream. At the end of each instruction, the address in the ScanPC is transferred to the Program Counter as the address of next instruction, and then incremented to again point to the word following the Operation word.

The value of the ScanPC at the time the first primitive is read is dependent on the Coprocessor instruction type. For the General type instruction, the ScanPC initially points to the word after the Command word. For the Branch type instruction, the ScanPC initially points to the word after the Operation word. For the Conditional type instruction, the ScanPC initially points to the word after the Condition Selection Code.

If in processing a General type instruction a primitive requests the transfer of an operand, and the Effective Address mode is immediate, the length must be either one or even and the transfer can only be from the Processor to the Coprocessor. If the operand length is one, the operand is transferred into the most significant byte of the Operand Register, and the ScanPC is incremented by two. If the operand length is greater than one, the operand is transferred as words, and the ScanPC is advanced by the number of bytes in the Length field.

If in processing a General type instruction a primitive requests the transfer of an operand, and if a previous primitive caused the ScanPC to be advanced, then the address extension follows the previously requested data in the instruction stream. The Coprocessor may require additional information after the Effective Address is calculated, in which case, additional extension words would follow the Effective Address extension.

If the Processor Status Register or ScanPC is changed by the Transfer Status Register and ScanPC primitive as described below, the Processor will refetch any instruction words prefetched from the instruction stream beyond the ScanPC.

The valid responses for a Coprocessor are as follows. Any response which the Processor does not recognize will cause a protocol exception as described below.

Null (No Operands)

This primitive is allowed with General, Branch, or Conditional types of instructions. PC and CA are allowed, and are processed as described above. If both the CA and IA (Interrupts Allowed) bits are set, the Processor may handle any interrupts which occur, then return to re-read the Response Register. However, the IA bit is ignored if CA=0. Any Null primitive with CA=0 is referred to as a Null_Done response.

The PC, CA, and IA related operations are performed for either General, Branch, or Conditional type instructions. For the General type instruction, no other operations are performed. For the Branch or Conditional type instruction, the Null_Done response terminates a Branch or Conditional type instruction and the instruction is executed depending on the TF (true/false) bit.

If the CA bit is set, this primitive informs the Processor that the Coprocessor is working on the current or a previous Coprocessor Command. This response may thus be used as a "busy" or "occupied" response by Coprocessors which contain a buffer for new Commands while completing execution of a previous Command. Those which do not buffer commands must return the Busy primitive instead, to force the reinitiation of the instruction.

Busy

This primitive informs the Processor that the Coprocessor is working on a previous Coprocessor Command. It is allowed for any General, Branch, or Conditional type instruction. The CA bit is ignored for this primitive. The PC bit should not be set for this primitive; it will cause the Program Counter to be written to the Instruction Address Register.

The Processor checks for interrupts and then reinitiates the instruction communication. This response is required from Coprocessors which can not buffer or capture a new Command while completing execution of a current Command. This primitive should only be given when no "destructive" primitive has been returned for the current instruction. A destructive primitive is any which may have altered any visible Processor or Coprocessor Register or status; the ScanPC is not considered a visible Register.

Release

The Release primitive signals the end of Coprocessor execution. This primitive is only needed for General type instructions. There is an implied release in the Null_Done primitive for Conditional and Branch type instructions. The CA and PC are not allowed on this primitive.

In order to provide for sequential operations during tracing, it is necessary for the Coprocessor to signal both the end of communications and the end of Coprocessor execution. Any primitive without Come Again indicates the end of required communication. If the Processor is not in trace mode, it is free to execute the next instruction. If the Processor is in trace mode, it must reread the Response Register. When the Coprocessor has successfully executed the Command, the Coprocessor returns the Release primitive.

If the Coprocessor is in either the Idle_Done or Idle_Excp state, reading the Response Register before writing the Command or Condition Register results in a Release response.

Evaluate Effective Address and Transfer Data

This primitive is allowed only with General type instructions. The PC and CA bits are allowed, and are processed as described above. The dr bit indicates the direction of data transfer between the Effective Address and the Operand Register of the Coprocessor. If dr=0, the operand is transferred from the Effective Address to the Coprocessor. If dr=1, the operand is transferred from the Coprocessor to the Effective Address.

The number of bytes transferred to/from the Effective Address is indicated in the Length field. A length of zero for a Register Direct Effective Address causes a protocol violation. If the Effective Address is a Processor Register (i.e. Register Direct) then only lengths of 1, 2, or 4 bytes are valid, and other lengths cause protocol violations. If the Effective Address mode is Immediate, the length must be one or even and the transfer can only be Processor to Coprocessor. If the Effective Address is a memory location, any length is valid, including odd.

If appropriate, the Coprocessor may limit an Effective Address evaluation to a class of modes, by encoding the Valid EA field as follows:

| 000 | Control Alterable |
| 001 | Data Alterable |
| 010 | Memory Alterable |
| 011 | Alterable |
| 100 | Control |
| 101 | Data |
| 110 | Memory |
| 111 | Any Effective Address (no restriction) |

If the Effective Address in the instruction is not of that class, then an abort is written to the Coprocessor Control Register and the Processor will trap to an F-line emulator provided in the operating system.

Evaluate and Transfer Effective Address

This primitive requests the Processor to evaluate the Effective Address, and to transfer that value to the Coprocessor Operand Address Register. This primitive is only allowed with General type instructions. The PC and CA bits are allowed and are processed as described above.

If the indicated length is zero, only Alterable Control Effective Address modes are allowed. If the length is non-zero, the Alterable Memory Effective Address modes are permitted.

Take Address and Transfer Data

This primitive requests the Processor to read from the Coprocessor Operand Address Register the address in memory of a operand. Then the Processor is to transfer that operand between the specified address and the Coprocessor Operand Register. This primitive is permitted with General, Branch, and Condition type instructions. The PC, CA and dr bits are allowed and are processed as described above. The number of bytes in the operand is specified by the Length field.

Transfer Status Register and Program Counter

This primitive requests the Processor to transfer either the Processor Status Register or both the Status Register and the ScanPC between the Processor and Coprocessor. This primitive is permitted only with the General type instruction. The PC, CA and dr bits are allowed and are processed as described above.

When SP=1 (ScanPC transfer), the ScanPC is also transferred between the Processor and the Coprocessor. If both the Status Register and the ScanPC are transferred, the order depends on the direction of transfer. If dr=0, first the ScanPC is transferred to the Coprocessor Instruction Address Register, and then the Status Register is transferred to the Operand Register. If dr=1, first the Operand Register is transferred to the Status Register, and then the Instruction Address Register is transferred to the ScanPC.

This primitive allows a Coprocessor to change the Processor flow of control other than with a Branch type instruction. Transfers to the Status Register include the trace mode, supervisor/user state, and the interrupt mask, as well as the Processor condition codes.

Transfer Operation Word

This primitive requests the Processor to transfer the Operation word to the Coprocessor Operation Word Register. This primitive is allowed in General, Branch and Conditional commands. The PC and CA bits are allowed and are processed as described above. This transfer has no effect on the ScanPC.

Transfer Instruction Stream

This primitive requests the Processor to transfer data from the instruction stream to the Coprocessor Operand Register. This primitive is allowed in General, Branch, and Conditional type instructions. The PC and CA bits are allowed and are processed as described above.

The indicated number of bytes from the instruction stream beginning at the ScanPC are transferred to the Coprocessor Operand Register. Only even byte counts are valid, odd byte counts cause a protocol violation. The ScanPC is advanced by the number of bytes transferred.

Transfer Registers

The following primitives request the transfer of one or more Processor or Coprocessor Registers. The PC, CA and dr bits are allowed and are processed as described above:

Transfer Single Processor Register

This primitive requests the Processor to transfer a long word between the particular Data or Address Register indicated in the four least-significant bits of the primitive and the Coprocessor Operand Register. This primitive is allowed in General, Branch, and Conditional type instructions. If D/A=0, the Register transferred is a Data Register, and if D/A=1, the Register transferred is an Address Register.

Transfer Processor Control Register

This primitive requests the Processor to transfer a Processor Control Register. This primitive is allowed in General, Branch, and Conditional type instructions. To determine which Register to transfer, the Processor reads a Control Register Selector from the Coprocessor Register Selector Register. The Processor then evaluates the Control Register Selector code and transfers a long word from the particular Processor Control Register to or from the Coprocessor Operand Register. The Control Register Selector encoding is the same as for the M68000 MOVEC instruction. If the Control Register Selector code is not recognized, the Processor aborts the instruction and takes an F-line Emulator trap.

Transfer Multiple Processor Registers

This primitive requests the Processor to transfer multiple Processor Data or Address Registers. This primitive is allowed in General, Branch, and Conditional type instructions. To determine which Registers to transfer, the Processor reads the Coprocessor Register Selector Register. The Processor uses the Register Selector value as a bit mask in the same manner as a M68000 MOVEM instruction, with bit 0 referring to D0, and bit 15 to A7. All 32 bits of each selected Register are transferred to or from the Coprocessor Operand Register.

Transfer Multiple Coprocessor Registers

This primitive requests the Processor to transfer multiple Coprocessor Registers to or from the Effective Address. This primitive is permitted only with the General type instruction. The indicated length is the length of each operand or Register. To determine which Registers to transfer, the Processor reads the Coprocessor Register Selector Register. Each bit in the Selector mask requires one Coprocessor Register to be transferred to or from the Coprocessor Operand Register as a single operand as above. The Coprocessor uses the bit mask to indicate which Register(s) are to be transferred; but the Processor simply counts the bits to determine when the required number of Registers has been tranferred. This limits the number of Registers transferred by a single primitive to 16. The Processor evaluates the Effective Address to determine the memory locations to or from which the multiple Registers are to be transferred. If the transfer is to the Coprocessor, only Post-increment or Control Effective Address modes are allowed. If the transfer is from the Coprocessor, only Pre-Decrement or Alterable Control Effective Address modes are allowed.

For the Post-Increment and Control Effective Address modes, successive Registers are transferred to or from memory locations with increasing addresses. For the Pre-Decrement Effective Address mode, successive Registers are transferred to memory locations with decreasing addresses, with bytes within a Register stored in increasing addresses. The number of registers and bytes is in the order transferred.

Transfer To From Top of Stack

This primitive requests the Processor to push a long word operand onto, or to pop a long word operand from, the active system stack. This primitive is allowed for General, Branch, and Conditional type instructions. The PC, CA and dr bits are allowed and are processed as described above. The Stack Pointer is modified appropriately for the push or pull. The stack data is transferred through the Operand Register.

Supervisor Check

This primitive allows the Coprocessor to check the Supervisor state of the Processor. This primitive is allowed with General, Branch or Conditional type instructions. The PC and CA are allowed and are processed as described above. If a privilege violation occurs, the CA bit has no effect. If the Processor is not in the Supervisor state, an abort is written to the Coprocessor Control Register, and the Processor takes a privilege violation exception.

Write to Previously Evaluated Effective Address

This primitive requests the Processor to write data from the Operand Register to the previously evaluated Effective Address. This primitive is allowed with only the General type instruction. The PC and CA are allowed and are processed as described above.

Only Alterable Effective Address modes should be used, although the Processor provides no checking of the Effective Address mode. For the Pre-decrement or Post-increment Effective Address modes, the Address Register value is not changed. It is possible to implement read-modify-write instructions (but not bus cycles) using this primitive and the Read from Effective Address primitive.

Take Exception

The following primitives allow a Coprocessor to force the Processor to take an exception. The PC bit is valid, and the CA bit is ignored for each of these primitives. The Processor acknowledges and clears all exceptions by writing a 1 to the Exception Acknowledge (XA) bit [1] of the Coprocessor Control Register. After the Processor acknowledges the exception request, it commences exception processing using the Exception Vector Number specified in the primitive. The difference between the three requests involves how the Processor returns from the exception. The different requests also require various amounts of state information to be stacked.

Coprocessors should always specify the F-Line Emulation Vector, not an illegal instruction vector, when an invalid Command is received. Likewise, the Processor always takes an F-line Emulation trap when it detects an illegal Coprocessor instruction.

Take Pre-Instruction Exception

This primitive is used to signal an exception which should be recognized before an instruction begins processing. This primitive should not be given after a destructive primitive has been given. The saved state allows the exception handler to return and have the Processor reinitiate the Coprocessor instruction which generated the exception.

A pre-instruction exception indicates that the Coprocessor instruction which is to be started has been terminated for exception processing. The causes for this exception can include illegal Command words, previous Coprocessor instruction terminated with an exception, or an exception being detected in the current instruction before starting execution.

A four-word state is saved. It consists of the Processor Status Register, the Program Counter (pointing to the current instruction), and the Exception Vector Number provided by the Coprocessor.

Take Mid-Instruction Exception

The mid-instruction exception indicates that communication between Coprocessor and Processor is to be broken off and resumed later. The saved state allows the exception handler to return and have the Processor continue the Coprocessor instruction where the exception was requested by reading the Coprocessor Response Register.

This primitive can be used by a Coprocessor to signal the Processor that the Coprocessor has encountered invalid or erroneous data and that it requires software handling before the Coprocessor can proceed with the current instruction.

A 10-word state is saved. The saved state includes the Status Register, the ScanPC, the Exception Vector Number, the Program Counter (pointing to the current instruction), an internal Register, the primitive, and the evaluated Effective Address. If no primitive has yet requested evaluation of the Effective Address, the value saved is undefined.

Take Post-Instruction Exception

A post-instruction exception occurs at the end of a Coprocessor instruction, terminating Coprocessor activity, before a Null_done or a Release response. The Processor assumes the instruction is complete or aborted. The saved state allows the exception handler to return and have the Processor begin execution of the instruction after the Coprocessor instruction which generated the exception.

A six-word state is saved. It consists of the Processor Status Register, the ScanPC (pointing to the next instruction), and the Exception Vector Number provided by the Coprocessor, and the Program Counter value (pointing to the instruction which caused the exception).

Processor/Coprocessor Protocol

In general, the Coprocessor needs access to various pieces of data in the system to perform their Commands. These data may be operands in memory, addresses of operands in memory, or Processor Registers. In addition, the Coprocessor may need to store data into Processor Registers or memory. Memory transfers may take different forms, depending on whether the Coprocessor is a DMA or a non-DMA Coprocessor.

Coprocessors may be divided into two types by their bus utilization characteristics. A Coprocessor is a DMA Coprocessor if it can control the bus independent of the Processor. A Coprocessor is a non-DMA Coprocessor if it does not have the capability of controlling the bus. Both Coprocessor types utilize the same protocol and Processor resources.

A Coprocessor that has a relatively low bus utilization requirement would typically be implemented as a non-DMA Coprocessor. In this form, all operand transfers are conducted by the Processor, at the request of the Coprocessor, and the Coprocessor is not required to be able to place addresses on the bus and provide bus control.

In contrast, a Coprocessor that consumes a significant portion of the bus bandwidth should be implemented as a DMA Coprocessor. The DMA Coprocessor is capable of controlling the bus when necessary to fetch or store operands. A DMA Coprocessor must be able to provide a full address and respond to all bus cycle termination signals. Since the capabilities of a DMA Coprocessor will vary according to the requirements it is designed to satisfy, the following discussion will be limited to non-DMA Coprocessors. If appropriate, any of the features available for use in the latter type may also be utilized in the former type.

Figure 15:
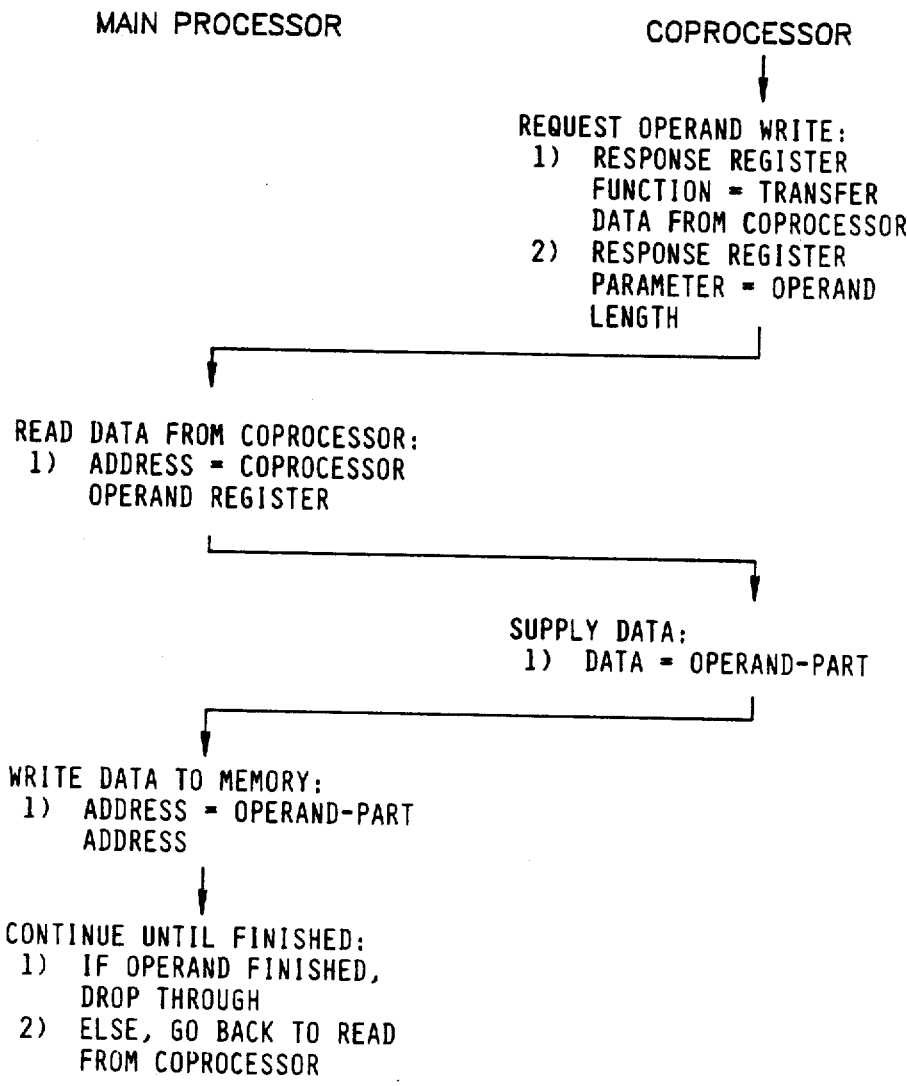
FIG. 15 illustrates the protocol for a non-DMA Coprocessor operand to memory transfer in the system of FIG. 1.

In non-DMA Coprocessors, all operands that must be transferred from memory to the Coprocessor are first read by the Processor into a Temporary Register. They are then written to the Coprocessor Operand Register. Operands flowing from Coprocessor to memory are transferred in a similar fashion: first a read by the Processor from the Coprocessor Operand Register into a Temporary Register, then a write to memory. These transfers are shown in FIGS. 14 and 15.

Operands of multiple bytes are transferred in order of ascending memory locations. Alignment of data transfers to or from the Operand Register is as described above. The Processor is responsible for proper alignment of word or long operand parts that are accessed at memory locations with odd byte or word addresses.

Operands to be transferred from Processor Registers to a Coprocessor are moved with a series of Processor write cycles. Similarly, operands that are to be transferred to Processor Registers are done with a series of Processor read cycles. The flow for these operations is similar to those for memory operands, but the bus cycles to access memory are not needed.

Figure 10:
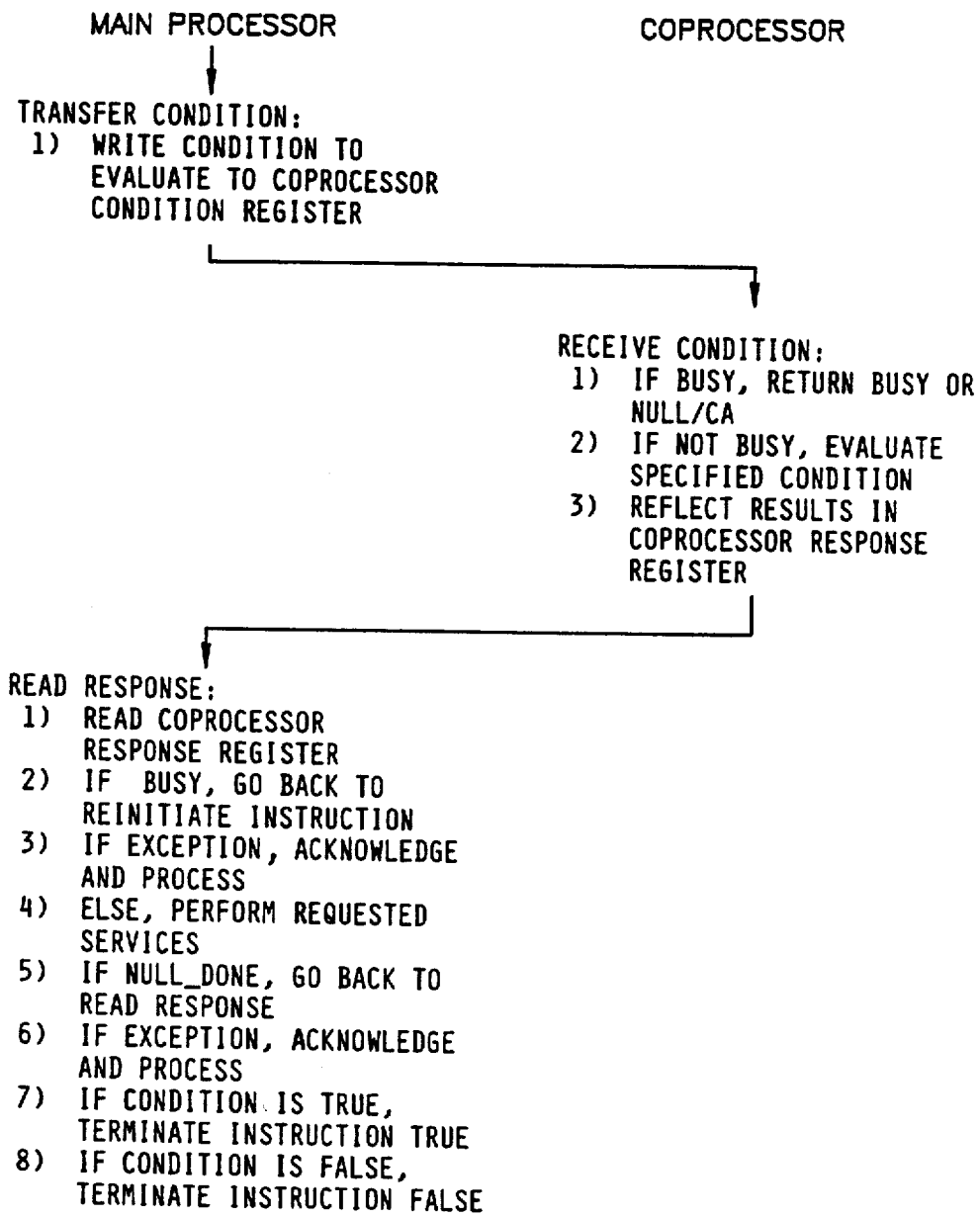
FIG. 10 illustrates the protocol for processing Conditional Branch or Set instructions in the system of FIG. 1.

FIG. 10 shows the protocol between the Processor and the Coprocessor during the processing of a Coprocessor Branch or Conditional type instruction. The Processor first writes the condition to the Coprocessor Condition Register to ask for an evaluation. The Coprocessor updates the Response Register to reflect the evaluation of the specified condition. The Processor then reads the Coprocessor Response Register and takes the appropriate action.

All primitives are legal with Branch or Conditional instructions except those which require the evaluation of an Effective Address, use of a previously evaluated Effective Address, or transfer of the Processor Status Register or ScanPC. A null or an exception primitive concludes communication during a Branch or Conditional type instruction.

Figure 11:
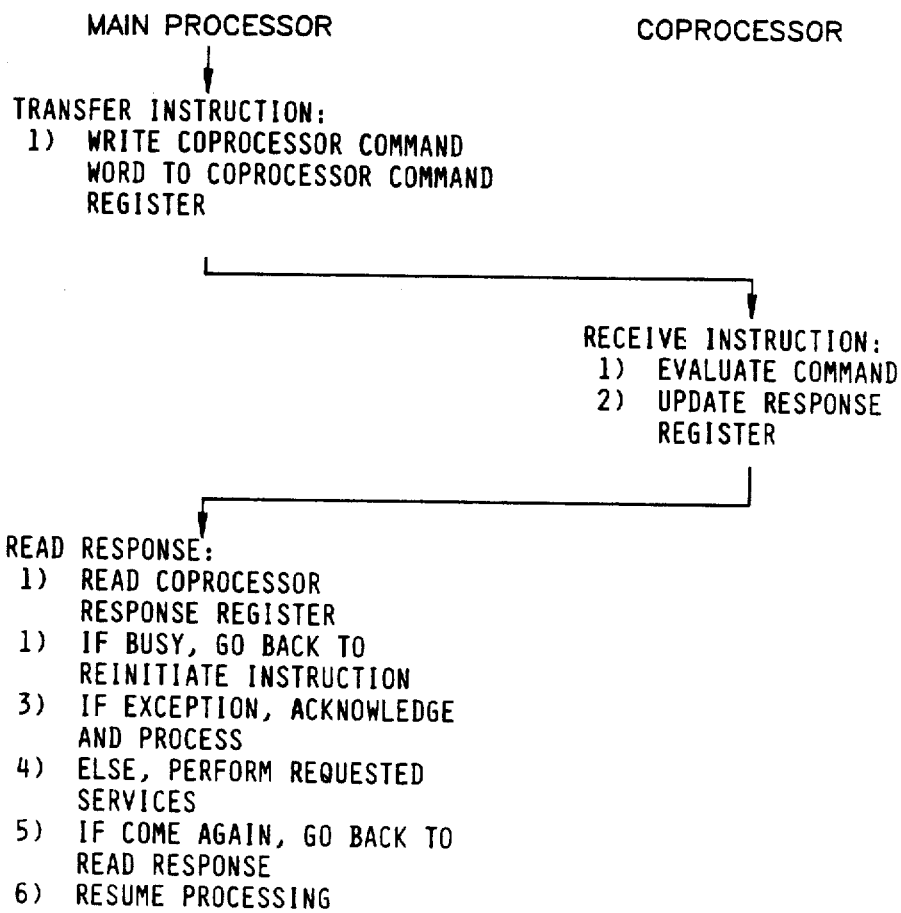
FIG. 11 illustrates the protocol for processing General instructions in the system of FIG. 1.

FIG. 11 shows the protocol between the Processor and the Coprocessor during the processing of a Coprocessor General type instruction. The Processor writes the Coprocessor Command word to the Coprocessor Command Register. The Coprocessor updates the Response Register to request any functions required of the Processor. The Processor then reads the Coprocessor Response Register and takes the appropriate action. The General type can conclude with any primitive when the CA bit is not set.

Figures 4A, 4B:
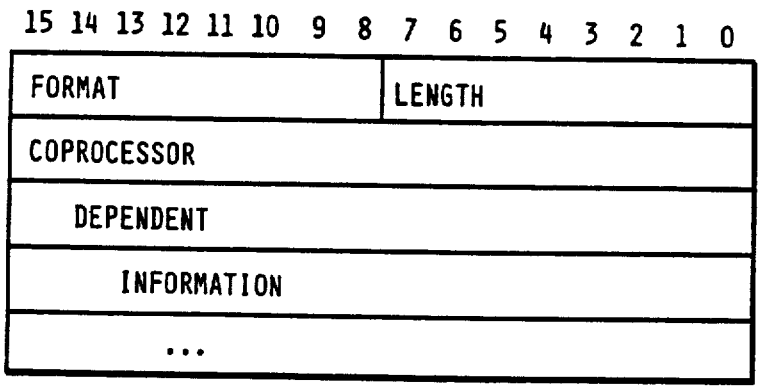
FIGS. 4a and 4b illustrate the Coprocessor state format and Format word, respectively, in the system of FIG. 1.
Figure 9A:
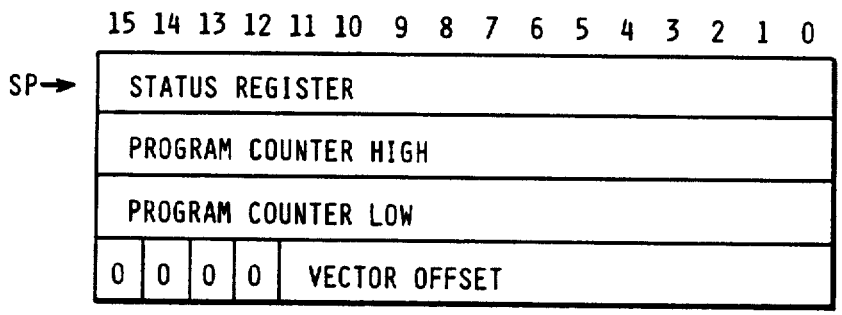
FIGS. 9a, 9b and 9c illustrate the exception stack formats for the system of FIG. 1.
Figure 9B:
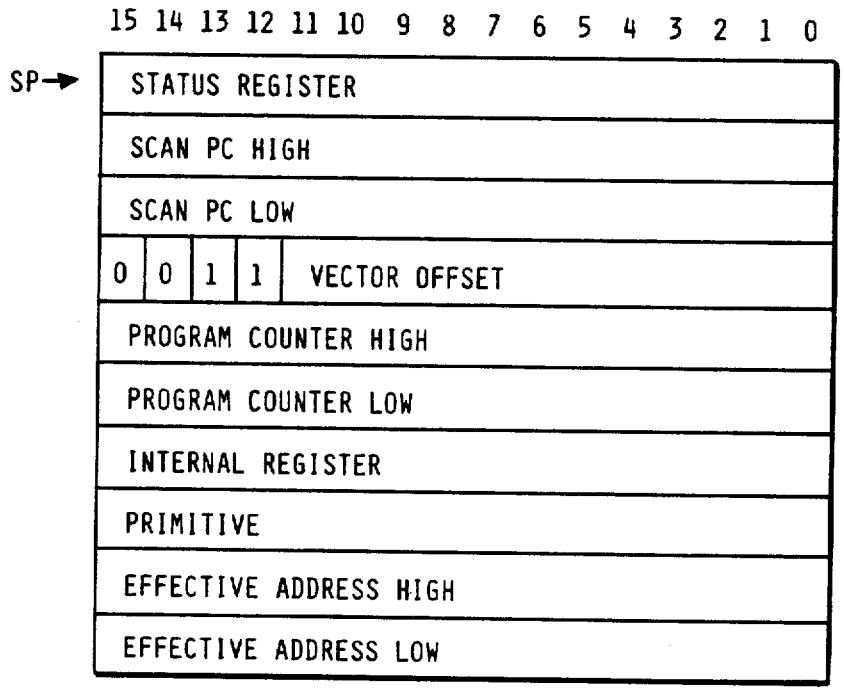
Figure 9C:
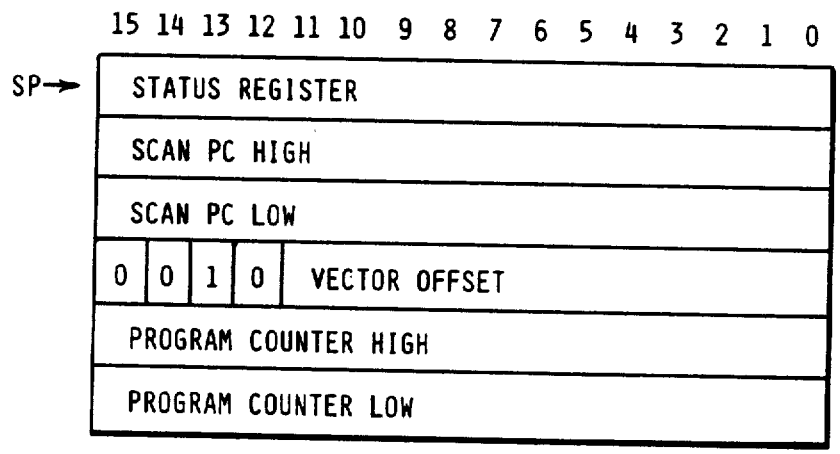

The Coprocessor Save and Restore type instructions transfer the internal state of the Coprocessor to and from memory. FIG. 4a shows the memory organization of this information. The first word of the frame, referred to as the Format word, contains a Format field which is Coprocessor-defined and verified, and a Length field for use by both processors. The Length field specifies the number of bytes of internal state information, and does not include the Format word itself nor the next word. The next word in memory is not used, but simply allows the frame to be long word aligned. Otherwise, the internal state information must be an integral multiple of four bytes in length. The information is transferred to and from the Coprocessor Operand Register four bytes at a time. The internal state coming from the Coprocessor is stored in the frame starting at the upper end, and is restored to the Coprocessor from memory starting from the lower end of the frame. In the Figure, the leftmost column indicates the Save order of the internal state, while the next column indicates the Restore order. The content of the Format word itself has some additional meaning, as shown in FIG. 4b.

In a multiprogramming environment, not all processes will make use of all Coprocessors. In order to distinguish when a process is making use of instructions for a particular Coprocessor, a special Format code is used. This Format code ($00), combined with a state length of zero, indicates that the Coprocessor has no user-loaded information. If the operating system detects this Format word, it need not save or restore the user-visible state information. This format is also appropriate for initializing the process state of a process before its first dispatch.

The Save operation may involve suspending execution of a Command, with the capability of resuming execution when the state is restored. For efficiency reasons, and if no further services are required of the Processor to complete the execution of the Command, the Coprocessor may elect to complete the execution of the Command in order to reduce the size of the saved state. Should this be desired, the $0E Format indicates that the Coprocessor has temporarily delayed the Save operation. This same format allows the Coprocessor to free the system bus when the Coprocessor needs time to prepare for either a Save or Restore operation.

During a Restore operation, the Coprocessor is asked to validate the Format word. If the Format code is not recognized by the Coprocessor, or the Length field is inappropriate for the given code, the Coprocessor may notify the Processor of this fact, by returning the $0F Format code when the Restore Register is next read.

The internal state frame must include all user invisible Registers, pending exceptions, status bits, etc. which would be required by the Coprocessor to resume the execution of a suspended Command at the point of suspension. If there is user visible information which may be saved and restored by General type data movement instructions, the inclusion of this information in the internal state frame is optional for the Coprocessor.

Figure 12:
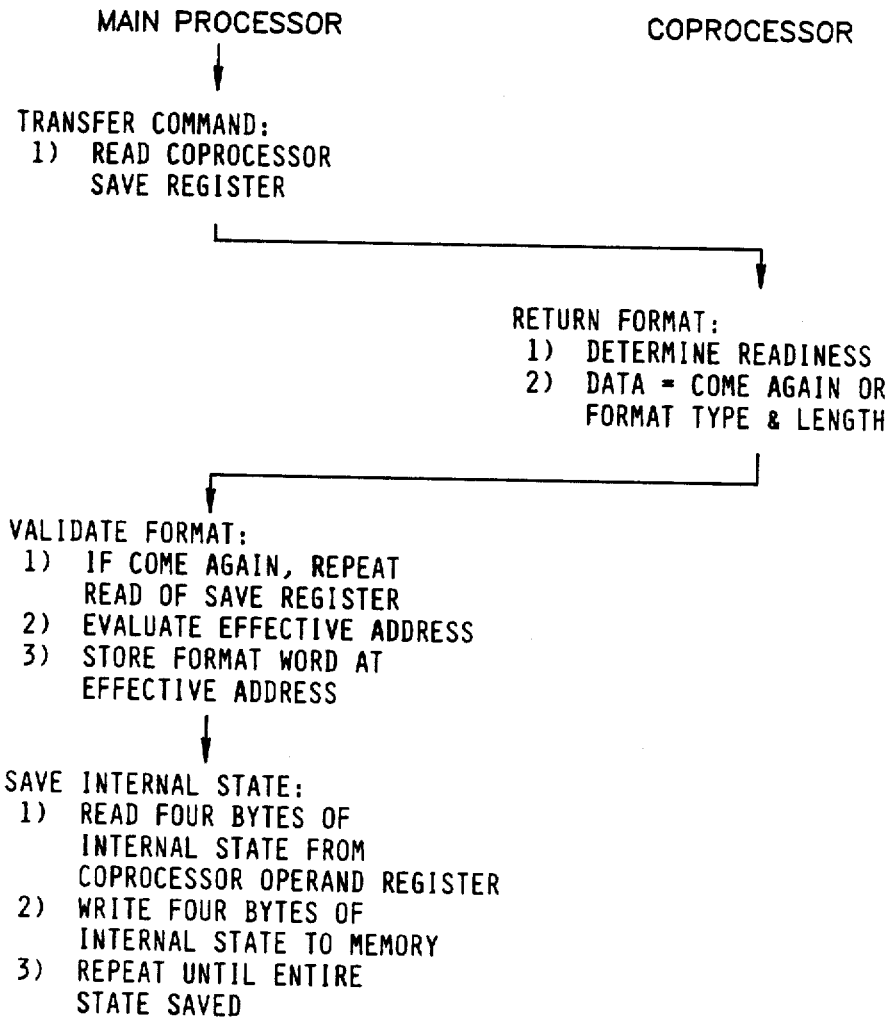
FIG. 12 illustrates the protocol for processing a Save operation in the system of FIG. 1.

The protocol between the Processor and the Coprocessor during the processing of a Coprocessor Save type instruction is shown in FIG. 12. The Processor initiates the Save operation with the Coprocessor by reading the Coprocessor Save Register. The Coprocessor responds by suspending operation and transmitting the internal machine state to the Processor. The data read from the Save Register is the Format word for the internal state frame of the Coprocessor. If the Coprocessor must delay before suspending operation, it indicates this by the returning the Come Again Format ($0E). Using the Format word, the Processor evaluates the Effective Address of the internal state frame, and writes the Format word in the frame. The Processor then reads the Coprocessor's state from the Operand Register a long word at a time and stores it at the Effective Address starting at the end of the frame. After the Save operation, the Coprocessor should be in the idle state with no pending exceptions.

Figure 13:
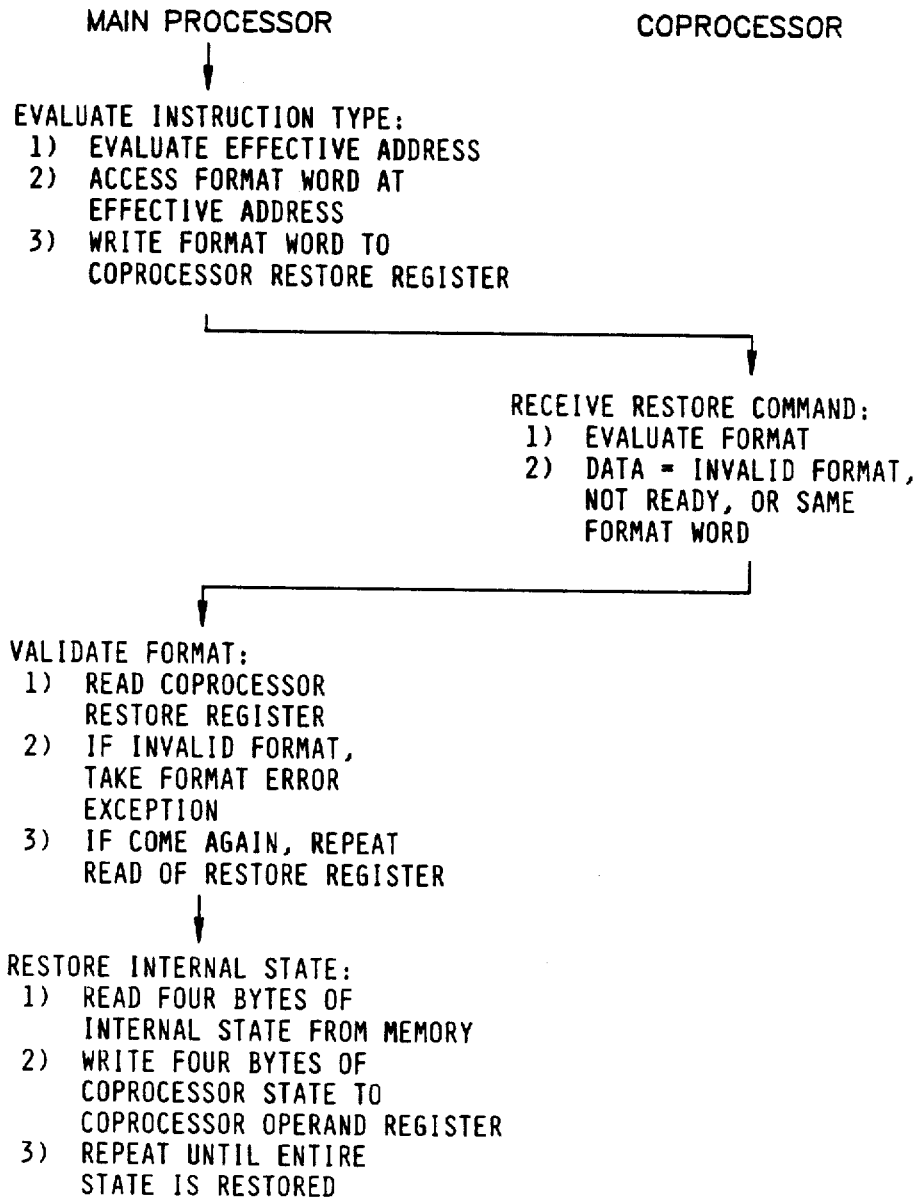
FIG. 13 illustrates the protocol for processing a Restore operation in the system of FIG. 1.

FIG. 13 shows the protocol between the Processor and the Coprocessor during the processing of a Coprocessor Restore type instruction. The Processor initiates the Restore operation by reading the state Format word from the internal state frame at the Effective Address and then writing the Format word to the Coprocessor Restore Register. The Length field in the Format word defines the size of the state. The Coprocessor validates the Format word, and the Processor reads the Restore Register. If the Format is invalid, the Coprocessor returns the Invalid Format code ($0F), the Processor acknowledges the exception to the Coprocessor Control Register, and takes a format error exception. If the Coprocessor must delay before beginning the Restore operation, it returns the Come Again Format code ($0E). If the Format is valid, the Coprocessor returns the Format word. The Processor reads the Coprocessor's state from memory starting at the beginning of the frame and writes it to the Coprocessor Operand Register a long word at a time.

Exception Processing

It is the responsibility of the Processor to coordinate exception handling for all Coprocessors. In general, exception handling for a Processor with a Coprocessor follows the same conventions as if the Processor were alone. Coprocessor exceptions typically occur as part of the normal processing of instructions, but the Coprocessor interface includes provisions for higher priority exceptions, namely, trace and interrupts. Coprocessor detected exceptions include all exceptions that are perceptible to the Coprocessor whether they are also perceptible to the Processor or not.

Figure 16:
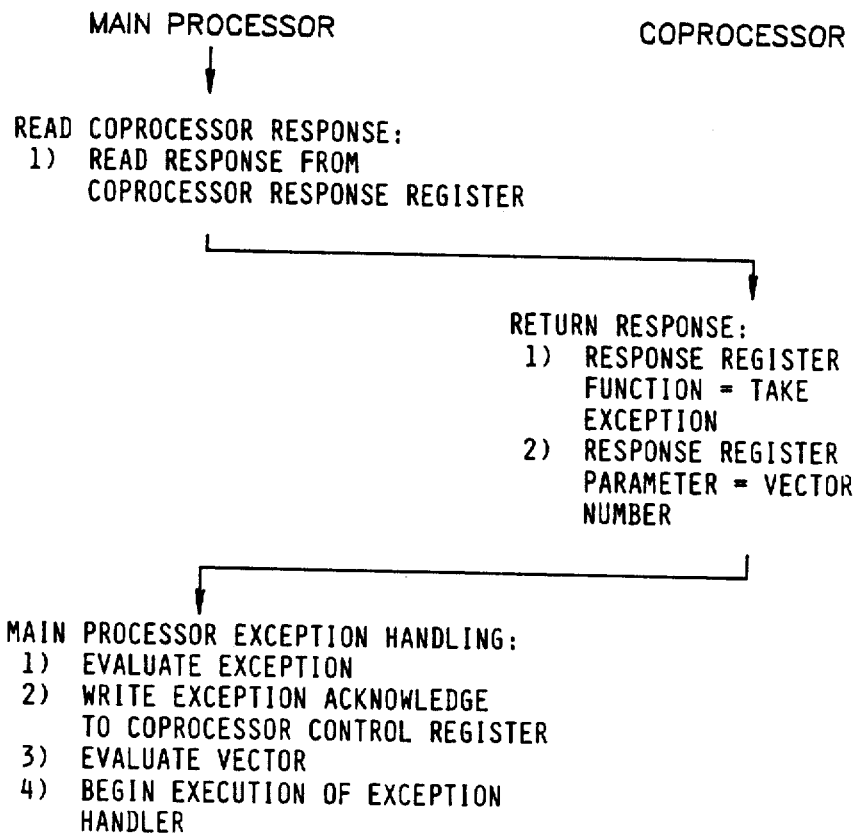
FIG. 16 illustrates the protocol for Coprocessor detected exceptions in the system of FIG. 1.

FIG. 16 shows the protocol for a Coprocessor detected exception. Upon detecting an exception, the Coprocessor will load an appropriate Take-Exception primitive into the Coprocessor Response Register. The Coprocessor also loads into the Response Register an Exception Vector Number which the Processor can use to address the particular exception handler required to resolve the exception. Upon next reading the Response Register, the Processor will become aware of the exception and will acknowledge the Coprocessor exception by writing to the Coprocessor Control Register to clear the exception. The Processor then takes the exception using the Coprocessor provided Exception Vector Number.

When the exception handler has completed its work, the handler will then exit and execution of the main program will resume
(a) at the beginning of the instruction at which the exception was reported (pre-instruction exception),
(b) at the point where the exception occurred (mid-instruction exception), or
(c) at the beginning of the next instruction (post-instruction exception).

A Protocol Violation occurs as a result of a breakdown in the Processor and Coprocessor communication protocol. Such a failure can occur at any point in the protocol. The Protocol Violation Exeception primitives have been designed in a manner which allows the Coprocessor to distinguish to the Processor the point at which the failure occurred.

If the Processor writes an illegal Coprocessor Command word to the Command Register or an invalid Condition code to the Condition Register, the Coprocessor will load the Take Pre-Instruction Exception primitive into the Response Register, together with the F-Line Emulator Vector Number. When the Processor next reads the Response Register, this primitive will indicate to the Processor that an illegal instruction has occurred.

If, after accepting a Command, the Coprocessor is expecting an access to the Operand Register, Operand Address Register, Instruction Address Register, or Register Selector Register, and instead the Processor accesses Command Register or Condition Register, the Coprocessor will terminate the incorrect access by returning DSACK and then load the Take Mid-Instruction Exception primitive into the Response Register, together with the Coprocessor Protocol Violation Vector Number. Similarly, if the Operand Register, Operand Address Register, Instruction Address, or Register Selector Registers are accessed when not expected, the Take Mid-Instruction Exception should be signaled. The Protocol Violation will be discovered by the Processor when it next reads the Response Register. Of course, a read of the Save Register is always valid, as is a write to the Restore Register. All innocuous bus accesses, not covered above, do not cause an exception.

If there is an exception pending from a previous concurrent Coprocessor instruction, such as a trap or computation error, the Coprocessor will load the Take Post-Exception primitive into the Response Register. When the Processor next attempts to initiate a General, Branch, or Conditional instruction and then reads the Response Register, this primitive will indicate to the Processor that a trap or computation error has occurred by loading the Take Pre-Instruction Exception primitive into the Response Register, together with the Vector Number of the proper exception handling routine.

Upon reading any of the Exception primitives, the Processor acknowledges and clears the exception by writing an Exception Acknowledge code to the Coprocessor Control Register. The Processor then retrieves the address of the particular exception handler routine stored at the designated Exception Vector Number, and branches to the exception handler. Upon resuming execution of the program, the Processor will reinitiate the instruction which was being executed when the exception was detected. If appropriate, the Coprocessor can report an illegal instruction at this time.

The exceptions detected by a DMA Coprocessor that are generated externally include those associated with bus activity and any system related exceptions. When a bus cycle-associated exception occurs, it is only applicable to the processor controlling the bus. System exceptions are non bus cycle-associated events (like interrupts) detected by either Coprocessors or the Processor even when that processor is not bus master. The actions to be taken by the Coprocessor and the Processor are not general since it is highly dependent upon the exception encountered.

When an address error or bus error occurs which is detected by a DMA Coprocessor, any information necessary to handle the exception is stored into system accessible Registers, and the Take Mid-Instruction Exception primitive is loaded into the Coprocessor Response Register together with the Vector Number to the proper exception handling routine. The Coprocessor then relinquishes control of the bus and awaits the next access by the Processor during which the response will be read. This response will indicate to the Processor that a bus cycle fault has occurred and that the Processor should vector to the proper exception handling routine.

A Response Register value of all zeroes or all ones is not a valid primitive. These, or any other such invalid primitive detected by the Processor will not be signaled to the Coprocessor. Instead, in order to provide for emulation of future extensions of the Coprocessor interface, the Processor takes an exception using the Protocol Violation vector and the mid-instruction exception stack frame. This allows the operating system to emulate any extensions to the interface, and then return.

The Processor may deem properly formed requests invalid if they specify operations that are illegal, such as writing to a non-alterable Effective Address. Such invalid primitives detected by the Processor will be signaled to the Coprocessor by writing the Abort code to the Coprocessor Control Register. The Processor then takes an exception using the F-line Emulator vector and the pre-instruction exception stack frame. This allows the operating system to emulate any extensions to the Coprocessor, and then return. This assumes that no destructive primitives have been processed in this instructon prior to the receipt of the primitive which caused the exception.

When the Processor is executing in the trace mode, it is desirable that any Coprocessor instructions, either concurrent or non-current, have finished processing by the Coprocessor before the Processor takes the trace exception. For the General type instruction, the communication between Processor and Coprocessor is closed when the Coprocessor returns a response without Come Again. If the Processor is in trace mode, the Processor will continue to read the Response Register. While the Coprocessor is processing the Command, it will respond to the Processor using the $Null_{13}Done$ primitive. When the Coprocessor is finished processing, it will respond to the Processor using the Release primitive. Upon receiving the Release primitive, the Processor can be sure that the Command was completed and can take the trace exception. For the Branch and Conditional type instructions, the $Null_{13}Done$ primitive is an implicit release, and the Processor is free to finish its processing on the instruction and then take the trace exception.

When the Coprocessor is busy processing a Command, but requires further help from the Processor in order to finish the instruction, it should allow the Processor to sample interrupts by responding with the Null primitive, with Come Again and Interrupts Allowed. If there is no interrupt pending, the Processor simply returns to query the Response Register again. If there is a pending interrupt, the Processor takes the interrupt exception, using the mid-instruction stack frame. After the interrupt handler has processed the interrupt, it can return and the Processor again queries the Response Register. Thus to the Coprocessor the receipt of an interrupt by the Processor merely looks like an extraordinarily slow Processor. If the Processor must be redispatched after the interrupt is processed, the state of the Coprocessor may be saved by the Save type instruction and later restored by a Restore type instruction.

Bus cycle faults while processing Coprocessor instructions can come during the CPU Address Space cycles which the Processor uses to communicate with the Coprocessor, or during memory cycles while the Processor is accessing data or instructions.

If the Processor receives a fault while running the bus cycle which initiates a Coprocessor instruction, it assumes that there is no Coprocessor in the system, and takes an F-line Emulator trap. If any other Coprocessor access is faulted, it assumes that the Coprocessor has failed, and takes a Bus Error exception.

If the Processor has a memory fault while executing a Coprocessor instruction, it takes an Address Error or Bus Error exception. After the fault handler has corrected the fault condition, it may return, and the communication with the Coprocessor continues as if the fault had not occurred. If the Processor must be redispatched while the fault condition is being corrected, the state of the Coprocessor may be saved by the Save type instruction and later restored by a Restore type instruction.

When the Processor receives a Reset signal or executes a Reset instruction, the Coprocessor should be reset, and if appropriate, initialized. There should be no distinction made between an entire system reset and the execution of a Reset instruction. The Coprocessor has no need to initiate a reset.

For further details regarding the internal architecture and operation of a Processor which may be adapted for use in the present invention, reference may be made to the following U.S. Patents relating to the Motorola M68000 microprocessor:

1. U.S. Pat. No. 4,296,469, entitled EXECUTION UNIT FOR DATA PROCESSOR USING SEGMENTED BUS STRUCTURE.

2. U.S. Pat. No 4,325,121, entitled TWO-LEVEL CONTROL STORE FOR MICROPROGRAMMED DATA PROCESSOR.

3. U.S. Pat. No. 4,338,661, entitled CONDITIONAL BRANCH UNIT FOR MICROPROGRAMMED DATA PROCESSOR.

4. U.S. Pat. No. 4,312,034, entitled ALU AND CONDITION CODE CONTROL UNIT FOR DATA PROCESSOR.

5. U.S. Pat. No. 4,348,722, entitled BUS ERROR RECOGNITION FOR MICROPROGRAMMED DATA PROCESSOR.

6. U.S. Pat. No. 4,349,873, entitled MICROPROCESSOR INTERRUPT PROCESSING.

While the invention has been described in the context of a preferred embodiment, it will be apparant to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A method for a first data processor to coordinate, via a communication bus, execution by a second data processor of an instruction received by said first processor for execution thereby, using only standard bus cycles on said communication bus, said instruction including a type field indicative of instruction type, the method comprising the steps of:

receiving said instruction;

writing to said second processor at a unique address within the address space of said first processor, using said standard common bus cycles, at least the type field of said received instruction; immediately reading a response from said second processor at said unique address using said standard bus cycles after said second processor has received said type field on said received instruction;

examining said response;

selectively performing a predetermined task selected by said response when said response indicates that said task must be performed by said first processor in support of the execution of said instruction by said second processor; but vectoring to a predetermined exception handler when said response selects a task other than said predetermined task must be performed by said first processor in support of the execution of said instruction by said second processor.

2. The method of claim 1 wherein the step of performing said task comprises performing a particlar one of a plurality of predetermined tasks selected by said response; and wherein said step of vectoring comprises vectoring to said exception handler if a task other than one of said plurality of predetermined tasks is selected by said response.

3. The method of claim 1 wherein said step of reading comprises repeatedly reading a response from said second processor until said response indicates that said second processor is not busy.

4. The method of claim 3 wherein the step of performing said task comprises performing a particular one of a plurality of predetermined tasks selected by said response; and wherein said step of vectoring comprises vectoring to said exception handler if a task other than one of said plurality of predetermined tasks is selected by said response.

5. The method of claim 1 further comprising the step of repeating the steps of reading said response and performing said tasks until said response indicates that no further tasks must be performed by said first processor in support of the execution of said instruction by said second processor.

* * * * *